(12) United States Patent
Kondo

(10) Patent No.: US 9,979,982 B2
(45) Date of Patent: May 22, 2018

(54) IMAGE DECODING APPARATUS, IMAGE ENCODING APPARATUS, AND METHOD AND PROGRAM FOR IMAGE DECODING AND ENCODING

(71) Applicant: Sony Corporation, Tokyo (JP)

(72) Inventor: Kenji Kondo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 15/432,338

(22) Filed: Feb. 14, 2017

(65) Prior Publication Data

US 2017/0164005 A1 Jun. 8, 2017

Related U.S. Application Data

(63) Continuation of application No. 14/720,265, filed on May 22, 2015, now Pat. No. 9,596,476, which is a
(Continued)

(30) Foreign Application Priority Data

Jun. 9, 2010 (JP) .................................. 2010-131891

(51) Int. Cl.
*G06K 9/36* (2006.01)
*H04N 19/61* (2014.01)
(Continued)

(52) U.S. Cl.
CPC ........... *H04N 19/61* (2014.11); *H04N 19/124* (2014.11); *H04N 19/176* (2014.11); *H04N 19/184* (2014.11); *H04N 19/44* (2014.11)

(58) Field of Classification Search
None
See application file for complete search history.

(56) References Cited

U.S. PATENT DOCUMENTS

| 5,721,588 A | 2/1998 | Fujiwara et al. |
| 5,878,169 A * | 3/1999 | Miyamoto ........... H04N 19/537 375/E7.261 |

(Continued)

FOREIGN PATENT DOCUMENTS

| EP | 0 771 119 A2 | 5/1997 |
| JP | 2005-130417 | 5/2005 |

(Continued)

OTHER PUBLICATIONS

L. Xu, K. N. Ngan and M. Wang, "Video content dependent directional transform for intra frame coding," 2012 Picture Coding Symposium, Krakow, 2012, pp. 197-200.*
(Continued)

*Primary Examiner* — Andrae S Allison
(74) *Attorney, Agent, or Firm* — Oblon, McClelland, Maier & Neustadt, L.L.P.

(57) ABSTRACT

An encoded bit stream is processed by a lossless decoding unit, an inverse quantization unit, and an inverse orthogonal transform unit in this order, to obtain orthogonally transformed coefficient data and encoding parameter information. The inverse orthogonal transform unit performs an inverse orthogonal transform on the coefficient data by using bases that are set beforehand in accordance with the locations of transform blocks in a macroblock indicated by the encoding parameter information. In this manner, prediction error data is obtained. An intra prediction unit generates predicted image data. An addition unit adds the predicted image data to the prediction error data, to decode image data. By using bases that are set in accordance with the locations of transform blocks, an optimum inverse orthogonal transform can be performed, and encoding efficiency can be increased.

8 Claims, 23 Drawing Sheets

Related U.S. Application Data continuation of application No. 13/701,319, filed as application No. PCT/JP2011/061974 on May 25, 2011, now Pat. No. 9,053,549.

(51) Int. Cl.
  *H04N 19/184* (2014.01)
  *H04N 19/176* (2014.01)
  *H04N 19/124* (2014.01)
  *H04N 19/44* (2014.01)

(56) References Cited

U.S. PATENT DOCUMENTS

| | | | |
|---|---|---|---|
| 5,883,673 A | 3/1999 | Miyamoto | |
| 6,421,385 B1 | 7/2002 | Uenoyama et al. | |
| 6,430,224 B1 | 8/2002 | Naito et al. | |
| 7,853,091 B2 | 12/2010 | Lee et al. | |
| 7,860,170 B2 | 12/2010 | Sugiyama | |
| 8,275,033 B2* | 9/2012 | Zhang | H04N 19/139 348/448 |
| 8,526,494 B2* | 9/2013 | Utsunomiya | H04N 5/4401 375/240.1 |
| 8,606,942 B2* | 12/2013 | Perlman | A63F 13/12 709/203 |
| 8,619,188 B2* | 12/2013 | Huang | G11B 27/034 348/441 |
| 9,053,549 B2* | 6/2015 | Kondo | G06T 9/004 |
| 9,596,476 B2* | 3/2017 | Kondo | G06T 9/004 |
| 2002/0009141 A1 | 1/2002 | Yamaguchi et al. | |
| 2007/0189624 A1 | 8/2007 | Etoh et al. | |
| 2009/0016621 A1* | 1/2009 | Nakagawa | H04N 19/105 382/236 |
| 2009/0207911 A1* | 8/2009 | Minamoto | H04N 19/139 375/240.03 |
| 2010/0067574 A1* | 3/2010 | Knicker | G06T 5/002 375/240.12 |
| 2012/0163469 A1* | 6/2012 | Kim | H04N 19/176 375/240.18 |
| 2012/0307895 A1 | 12/2012 | Kim et al. | |
| 2013/0114731 A1 | 5/2013 | Lee et al. | |

FOREIGN PATENT DOCUMENTS

| | | |
|---|---|---|
| JP | 2008-004984 | 1/2008 |
| JP | 2009-272727 | 11/2009 |

OTHER PUBLICATIONS

K. Zhang, S. Lei and W. Gao, "Enhanced intra prediction and transform for video coding," 2010 IEEE International Conference on Image Processing, Hong Kong, 2010, pp. 3381-3384.*

F. Zou, O.C. Au, C. Pang and J. Dai, "Enhanced Intra Mode Dependent Directional Transform," APSIPA Annual Summit and Conference 2010 Singapore, Dec. 2010.*

Notification of first Office Action in National Phase of PCT Application No. 201180027201.5, dated Nov. 4, 2014.

Text of First Office Action in National Phase of PCT Application No. 201180027201.5, dated Nov. 4, 2014, issued by Patent Office of the People's Republic of China.

English-language international Search Report from Japanese Patent Office for PCT/JP2011//061974, dated Aug. 30, 2011.

Jeon, B. et al.; "Description of Video Coding Technology Proposal by LG Electronics," JCT-VC of ITU-T SG16 WP3 and ISO/IEC JTC1/SC29WG11; JCTVC-A110; Dresden, DE, pp. 1 and 4-13, (2010).

Budagavi, M. et al.; "Orthogonal MDDT and Mode Dependent DCT", Standardization Sectors Study Group 16, Question 6, Video Coding Experts Group (VCEG); VCEG-AM20, 39$^{th}$ Meeting: Kyoto, JP, pp. 1-9, (2010).

Karczewicz, M.; "Improved Intra Coding", ITU-Telecommunications Standardization Sector, Study Group 16, Question 6, Video Coding Experts Group (VCEG), VCEG-AF15, VCEG-AF15.doc, San Jose, CA (2007).

* cited by examiner

FIG. 2

PREDICTION MODE 0 (vertical)
(A)

PREDICTION MODE 1 (horizontal)
(B)

PREDICTION MODE 2 (DC)
(C)

PREDICTION MODE 3 (diagonal down-left)
(D)

PREDICTION MODE 4 (diagonal down-right)
(E)

PREDICTION MODE 5 (vertical-right)
(F)

PREDICTION MODE 6 (horizontal-down)
(G)

PREDICTION MODE 7 (vertical-left)
(H)

PREDICTION MODE 8 (horizontal-up)
(I)

*FIG. 3*

(A) PREDICTION ERROR SMALL → LARGE

| | A | B | C | D |
|---|---|---|---|---|
| | P0 | P1 | P2 | P3 |
| | P4 | P5 | P6 | P7 |
| | P8 | P9 | P10 | P11 |
| | P12 | P13 | P14 | P15 |

PREDICTION MODE 0 (vertical)

(B) PREDICTION ERROR SMALL → LARGE

| | P0 | P1 | P2 | P3 |
|---|---|---|---|---|
| I | P0 | P1 | P2 | P3 |
| J | P4 | P5 | P6 | P7 |
| K | P8 | P9 | P10 | P11 |
| L | P12 | P13 | P14 | P15 |

PREDICTION MODE 1 (horizontal)

(C)

| M | A | B | C | D |
|---|---|---|---|---|
| I | P0 | P1 | P2 | P3 |
| J | P4 | P5 | P6 | P7 |
| K | P8 | P9 | P10 | P11 |
| L | P12 | P13 | P14 | P15 |

PREDICTION MODE 4 (diagonal down-right)   PREDICTION ERROR LARGE

FIG. 20

IMAGE DECODING APPARATUS, IMAGE ENCODING APPARATUS, AND METHOD AND PROGRAM FOR IMAGE DECODING AND ENCODING

This application is a continuation application of, and claims the benefit of priority under 35 U.S.C. § 120 from, U.S. application Ser. No. 14/720,265, filed May 22, 2015, herein incorporated by reference, which is a continuation of U.S. Pat. No. 9,053,549, issued Jun. 9, 2015, which is a National Stage Application of International Application No. PCT/JP2011/061974, filed May 25, 2011, which claims the benefit of priority under 35 U.S.C. § 119 from Japanese Patent Application No. 2010-131891, filed Jun. 9, 2010.

TECHNICAL FIELD

The present invention relates to an image decoding apparatus, an image encoding apparatus, and a method and a program for image decoding and encoding. More particularly, the present invention provides an image decoding apparatus and an image encoding apparatus that are capable of performing efficient decoding and encoding, and a method and a program for such decoding and encoding.

BACKGROUND ART

In recent years, to handle image information as digital information and achieve high-efficiency information transmission and accumulation, apparatuses compliant with a standard, such as MPEG for compressing image information through orthogonal transforms and motion compensations by using redundancy inherent to image information, have been spreading both among broadcast stations to distribute information and among general households to receive information.

Particularly, MPEG2 (ISO/IEC 13818-2) is defined as a general-purpose image encoding technique. The MPEG2 compression technique is applicable to interlaced images and non-interlaced images, and to standard-resolution images and high-definition images. Currently, MPEG2 is used for a wide range of applications for professionals and general consumers. By using the MPEG2 compression technique, a bit rate of 18 to 22 Mbps is assigned to interlaced images with a high resolution of 1920×1088 pixels, for example, to achieve high compression rates and excellent image quality.

MPEG2 is designed mainly for high-quality image encoding for broadcasting, but is not compatible with lower bit rates than MPEG1 or encoding techniques with higher compression rates. As mobile terminals are becoming popular, the demand for such encoding techniques is expected to increase in the future, and to meet the demand, the MPEG4 encoding technique has been set as a standard. As for image encoding techniques, the ISO/IEC 14496-2 standard was approved as an international standard in December 1998.

Further, in recent years, H.264 and MPEG-4 Part 10 (Advanced Video Coding, hereinafter referred to as H.264/AVC), which can achieve a higher encoding efficiency than encoding techniques such as MPEG2 and MPEG4, have become an international standard, though requiring a larger amount of calculation for decoding. H.264/AVC is based on H.26L, but also has functions unsupported by H.26L.

Patent Document 1 and the like disclose more efficient image data encoding using H.264/AVC.

CITATION LIST

Patent Document

Patent Document 1: Japanese Patent Application Laid-Open No. 2008-4984

SUMMARY OF THE INVENTION

Problems to be Solved by the Invention

In intra predictions, there has been a suggested technique called MDDT (Mode Dependent Directional Transform) that switches transform methods in accordance with the directions of the intra predictions. Where the MDDT technique is used, it is difficult to increase encoding efficiency, unless transforms to be performed in accordance with the directions of intra predictions are optimized.

Therefore, the present invention aims to provide an image decoding apparatus and an image encoding apparatus that can increase the encoding efficiency, and methods and programs for image decoding and encoding.

Solution to Problems

A first aspect of the invention is an image decoding apparatus that performs an orthogonal transform on prediction error data of each transform block, and decodes image data from an encoded bit stream generated by processing coefficient data subjected to the orthogonal transform, the prediction error data being the difference between the image data and predicted image data. The image decoding apparatus includes: a data processing unit that processes the encoded bit stream to obtain the coefficient data subjected to the orthogonal transform and encoding parameter information; an inverse orthogonal transform unit that performs an inverse orthogonal transform on the coefficient data by using a base to obtain the prediction error, the base being set beforehand in accordance with the location of the transform block in a macroblock indicated by the encoding parameter information; a predicted image data generation unit that generates the predicted image data; and an addition unit that adds the predicted image data generated by the predicted image data generation unit to the prediction error obtained by the inverse orthogonal transform unit, to decode the image data.

In the image decoding apparatus of the invention, when an inverse orthogonal transform is performed on orthogonally transformed coefficient data obtained by processing an encoded bit stream, an inverse orthogonal transform such as a Karhunen-Loeve inverse transform is performed by using a base that is set beforehand in accordance with the block locations of transform blocks in a macroblock indicated by encoding parameter information that is contained in the encoded bit stream and is designed for decoding image data, or with the block locations and the prediction mode indicated by the encoding parameter information. When the macroblock contains more than one transform block, a Karhunen-Loeve inverse transform is performed by using a base on orthogonally transformed coefficient data of the block using the lowest-frequency component coefficient after the orthogonal transform of the respective transform blocks, the base being set beforehand in accordance with the prediction mode. The base used by the inverse orthogonal transform unit is an inverse matrix of the base used in the orthogonal transform of the prediction error data of each transform block. With such bases being provided in advance, an inverse orthogonal transform is performed by using a base selected in accordance with a block location or the like, to generate the prediction error data not yet subjected to the orthogonal transform.

A second aspect of the invention is an image decoding method for performing an orthogonal transform on prediction error data of each transform block, and decoding image data from an encoded bit stream generated by processing coefficient data subjected to the orthogonal transform, the prediction error data being the difference between the image data and predicted image data. The image decoding method includes the steps of: processing the encoded bit stream to obtain the coefficient data subjected to the orthogonal transform and encoding parameter information; performing an inverse orthogonal transform on the coefficient data by using a base to obtain the prediction error, the base being set beforehand in accordance with the location of the transform block in a macroblock indicated by the encoding parameter information; generating the predicted image data; and adding the generated predicted image data to the prediction error obtained by the inverse orthogonal transform unit, to decode the image data.

A third aspect of the invention is a program for causing a computer to perform an orthogonal transform on prediction error data of each transform block, and decode image data from an encoded bit stream generated by processing coefficient data subjected to the orthogonal transform, the prediction error data being the difference between the image data and predicted image data. The program causes the computer to: process the encoded bit stream to obtain the coefficient data subjected to the orthogonal transform and encoding parameter information; perform an inverse orthogonal transform on the coefficient data by using a base to obtain the prediction error, the base being set beforehand in accordance with the location of the transform block in a macroblock indicated by the encoding parameter information; generate the predicted image data; and add the generated predicted image data to the prediction error obtained by the inverse orthogonal transform unit, to decode the image data.

A fourth aspect of the invention is an image encoding apparatus that encodes image data. The image encoding apparatus includes: a prediction unit that generates predicted image data of the image data; a subtraction unit that generates prediction error data, the prediction error data being the difference between the image data and the predicted image data; an orthogonal transform unit that performs an orthogonal transform on the prediction error of each transform block by using a base set beforehand in accordance with a location of the transform block in a macroblock; and a data processing unit that processes data output from the orthogonal transform unit, to generate an encoded bit stream.

In the image encoding apparatus of the invention, when prediction error data indicating the difference between image data and predicted image data is orthogonally transformed for each transform block, an orthogonal transform such as a Karhunen-Loeve transform is performed by using a base set beforehand in accordance with the block locations of the transform blocks in a macroblock or with the block locations and the prediction mode used when the predicted image data is generated. When the macroblock contains more than one transform block, a Karhunen-Loeve transform is performed on the block formed with the lowest-frequency component coefficient after the orthogonal transform of the respective transform blocks. In this Karhunen-Loeve transform, a base that is set beforehand in accordance with the prediction mode is used. This base is eigenvectors corresponding to the engenvalues of a matrix calculated from each macroblock size, each transform block size, each location of the transform blocks in the macroblock, and prediction error data in each transform block in each prediction mode. The base is grouped in accordance is the distance between bases or the distance from a reference pixel. With such bases being provided in advance, an orthogonal transform is performed by using a base selected in accordance with a block location or the like. Further, processing such as quantization and lossless coding is performed on the orthogonally transformed coefficient data, to generate an encoded bit stream.

A fifth aspect of the invention is an image encoding method for encoding image data. The image encoding method includes the steps of: generating predicted image data of the image data; generating prediction error data, the prediction error data being the difference between the image data and the predicted image data; and performing an orthogonal transform on the prediction error of each transform block by using a base set beforehand in accordance with the location of the transform block in a macroblock.

A sixth aspect of the invention is a program for causing a computer to encode image data. The program causes the computer to: generate predicted image data of the image data; generate prediction error data, the prediction error data being the difference between the image data and the predicted image data; and perform an orthogonal transform on the prediction error of each transform block by using a base set beforehand in accordance with the location of the transform block in a macroblock.

The program of the present invention is a program that can be provided to a general-purpose computer system capable of executing various program codes via a storage medium or a communication medium provided in a computer-readable form, such as an optical disk, a magnetic disk, a semiconductor memory, or a network. By providing such a program in a computer-readable form, processing according to the program is realized in a computer system.

Effects of the Invention

According to the invention, at the time of image data encoding, an orthogonal transform is performed by using a base that is set beforehand in accordance with the block locations of transform blocks in a macroblock. Also, in decoding an encoded bit stream generated by processing coefficient data obtained through an orthogonal transform using a base set beforehand in accordance with the block locations, an inverse orthogonal transform is performed by using the base that is set beforehand in accordance with the block locations in the macroblock indicated by the encoding parameter information contained in the encoded bit stream. Accordingly, the orthogonally transformed coefficient data can be returned to the prediction error data not yet subjected to the orthogonal transform. As an orthogonal transform and an inverse orthogonal transform are performed by using the bases compatible with the block locations in a macroblock as described above, transforms that are optimized in accordance with the block locations can be performed, and encoding efficiency can be increased.

BRIEF DESCRIPTION OF DRAWINGS

FIG. 2 are diagrams showing intra prediction modes for 4×4 pixel blocks.

FIG. 3 are diagrams showing the relationships between prediction modes and prediction errors.

FIG. 20 are diagrams for explaining base grouping.

MODES FOR CARRYING OUT THE INVENTION

The following is a description of embodiments for carrying out the invention. The description will be made in the following order.

1. Structure of an Image Encoding Apparatus
2. Structure of the Orthogonal Transform Unit
3. Operations of the Image Encoding Apparatus
4. Structure of an Image Decoding Apparatus
5. Structure of the Inverse Orthogonal Transform Unit
6. Operations of the Image Decoding Apparatus
7. Base Learning Operation
8. Case of Software Processing
9. Case of Application to an Electronic Device <1. Structure of an Image Encoding Apparatus>

Figure 1:
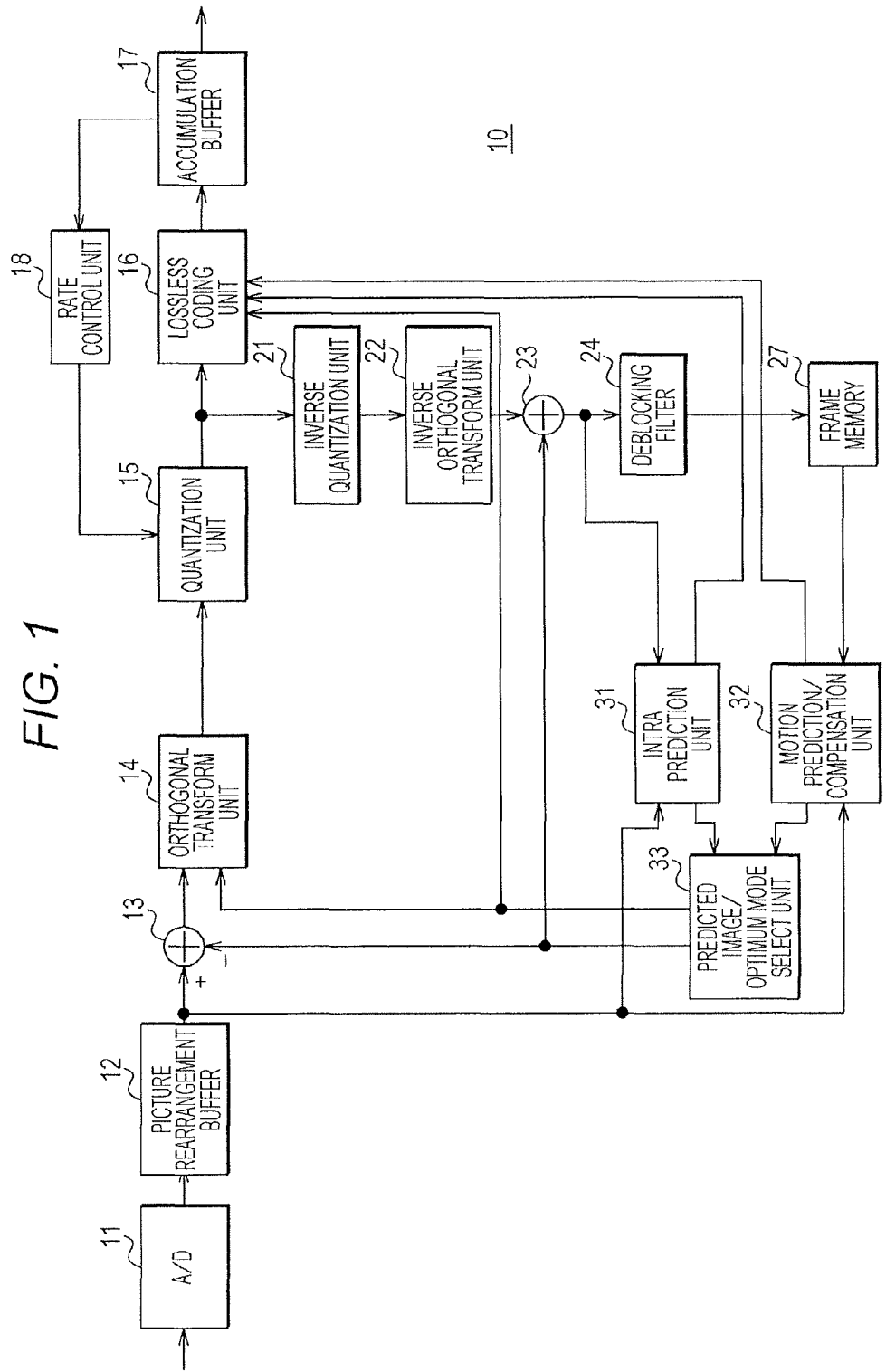
FIG. 1 is a diagram illustrating the structure of an image encoding apparatus.

FIG. 1 illustrates the structure of an image encoding apparatus. The image encoding apparatus 10 includes an analog/digital conversion unit (A/D conversion unit) 11, a picture rearrangement buffer 12, a subtraction unit 13, an orthogonal transform unit 14, a quantization unit 15, a lossless coding unit 16, an accumulation buffer 17, and a rate control unit 18. The image encoding apparatus 10 further includes an inverse quantization unit 21, an inverse orthogonal transform unit 22, an addition unit 23, a deblocking filter 24, a frame memory 27, an intra prediction unit 31, a motion prediction/compensation unit 32, and a predicted image/optimum mode select unit 33.

The A/D conversion unit 11 converts analog image signals into digital image data, and outputs the image data to the picture rearrangement buffer 12.

The picture rearrangement buffer 12 rearranges the frames of the image data output from the A/D conversion unit 11. The picture rearrangement buffer 12 rearranges the frames in accordance with the GOP (Group of Pictures) structure related to encoding operations, and outputs the rearranged image data to the subtraction unit 13, the intra prediction unit 31, and the motion prediction/compensation unit 32.

The subtraction unit 13 receives the image data output from the picture rearrangement buffer 12 and predicted image data selected by the later described predicted image/optimum mode select unit 33. The subtraction unit 13 calculates prediction error data that is the difference between the image data output from the picture rearrangement buffer 12 and the predicted image data supplied from the predicted image/optimum mode select unit 33, and outputs the prediction error data to the orthogonal transform unit 14.

The orthogonal transform unit 14 performs an orthogonal transform operation on the prediction error data output from the subtraction unit 13. When making an intra prediction, the orthogonal transform unit 14 performs an orthogonal transform operation in accordance with the prediction mode. The orthogonal transform unit 14 outputs coefficient data obtained by performing the orthogonal transform operation to the quantization unit 15.

The quantization unit 15 receives the coefficient data output from the orthogonal transform unit 14 and a rate control signal supplied from the later described rate control unit 18. The quantization unit 15 quantizes the coefficient data, and outputs the quantized data to the lossless coding unit 16 and the inverse quantization unit 21. Based on the rate control signal supplied from the rate control unit 18, the quantization unit 15 switches quantization parameters (quantization scales), to change the bit rate of the quantized data.

The lossless coding unit 16 receives the quantized data output from the quantization unit 15, and encoding parameter information supplied from the later described intra prediction unit 31, the motion prediction/compensation unit 32, and the predicted image/optimum mode select unit 33. The encoding parameter information contains information indicating whether the prediction is an intra prediction or an inter prediction, macroblock information indicating the macroblock size, information about intra predictions, information about inter predictions, and the like. The lossless coding unit 16 performs a lossless coding operation on the quantized data through variable-length coding or arithmetic coding or the like, to generate and output an encoded bit stream to the accumulation buffer 17. The lossless coding unit 16 also performs lossless coding on the encoding parameter information, and adds the resultant information to the header information in the encoded bit stream, for example. The quantization unit 15 and the lossless coding unit 16 are equivalent to the data processing unit that processes the data output from the orthogonal transform unit 14 to generate an encoded bit stream.

The accumulation buffer 17 stores the encoded bit stream supplied from the lossless coding unit 16. The accumulation buffer 17 also outputs the stored encoded bit stream in accordance with the transmission rate of the transmission path.

The rate control unit 18 monitors the free space in the accumulation buffer 17. The rate control unit 18 generates a rate control signal in accordance with the free space, and outputs the rate control signal to the quantization unit 15.

The rate control unit 18 obtains information about the free space from the accumulation buffer 17, for example. When the remaining free space is small, the rate control unit 18 lowers the bit rate of the quantized data through the rate control signal. When the remaining free space in the accumulation buffer 17 is sufficiently large, the rate control unit 18 increases the bit rate of the quantized data through the rate control signal.

The inverse quantization unit 21 inversely quantizes the quantized data supplied from the quantization unit 15. The inverse quantization unit 21 outputs the coefficient data obtained by performing the inverse quantization operation to the inverse orthogonal transform unit 22.

The inverse orthogonal transform unit 22 performs an inverse orthogonal transform operation on the coefficient data supplied from the inverse quantization unit 21, and outputs the resultant data to the addition unit 23.

The addition unit 23 adds the data supplied from the inverse orthogonal transform unit 22 to the predicted image data supplied from predicted image/optimum mode select unit 33, to generate reference image data. The addition unit 23 outputs the reference image data to the deblocking filter 24 and the intra prediction unit 31.

The deblocking filter 24 performs a filtering operation to reduce block distortions that occur at the time of image encoding. The deblocking filter 24 performs a filtering operation to remove block distortions from the reference image data supplied from the addition unit 23, and outputs the reference image data subjected to the filtering operation to the frame memory 27.

The frame memory 27 holds the reference image data that has been subjected to the filtering operation and is supplied from the deblocking filter 24.

The intra prediction unit 31 performs intra prediction operations by using the image data that is output from the picture rearrangement buffer 12 and is about the images to be encoded, and the reference image data supplied from the addition unit 23. The intra prediction unit 31 performs an intra prediction operation for each transform block size in orthogonal transforms and for each prediction mode in intra predictions. The intra prediction unit 31 outputs the generated predicted image data to the predicted image/optimum mode select unit 33. The intra prediction unit 31 also generates the encoding parameter information about the intra prediction operations, and outputs the encoding parameter information to the lossless coding unit 16 and the predicted image/optimum mode select unit 33. The intra prediction unit 31 incorporates the macroblock sizes, the transform block sizes, the locations of the transform blocks in the macroblocks, the prediction mode, and the like into the encoding parameter information.

The intra prediction unit 31 also calculates the cost function value in each of the intra prediction operations, and selects the intra prediction operation having the smallest cost function value as a result of the calculation, or the optimum intra prediction operation with the highest encoding efficiency. The intra prediction unit 31 outputs the encoding parameter information and the cost value in the optimum intra prediction operation, and the predicted image data generated through the optimum intra prediction operation to the predicted image/optimum mode select unit 33.

The motion prediction/compensation unit 32 performs inter prediction operations in all the motion-compensated block sizes corresponding to the macroblocks, to generate and output predicted image data to the predicted image/optimum mode select unit 33. Using the reference image data that has been subjected to the filtering operation and is read from the frame memory 27, the motion prediction/compensation unit 32 detects motion vectors from the image of each motion-compensated block size in the images that are read from the picture rearrangement buffer 12 and are about the images to be encoded. Based on the detected motion vectors, the motion prediction/compensation unit 32 further performs a motion compensation operation on the reference image, to generate predicted image data. The motion prediction/compensation unit 32 also generates encoding parameter information about the inter prediction operations, such as encoding parameter information indicating the macroblock sizes, the motion-compensated block sizes, the motion vectors, and the like. The motion prediction/compensation unit 32 outputs the encoding parameter information to the lossless coding unit 16 and the predicted image/optimum mode select unit 33.

The motion prediction/compensation unit 32 also calculates the cost function value for each motion-compensated block size, and selects the inter prediction operation having the smallest cost function value as a result of the calculation, or the inter prediction operation with the highest encoding efficiency. The motion prediction/compensation unit 32 outputs the encoding parameter information and the cost value in the optimum inter prediction operation, and the predicted image data generated through the optimum inter prediction operation to the predicted image/optimum mode select unit 33.

When the intra prediction unit 31 performs an intra prediction operation for each transform block size and each prediction mode to select the optimum intra prediction operation, the predicted image/optimum mode select unit 33 outputs the encoding parameter information to the orthogonal transform unit 14, the lossless coding unit 16, and outputs the predicted image data to the subtraction unit 13. When the motion prediction/compensation unit 32 performs an inter prediction operation for each prediction block to select the optimum inter prediction operation, the predicted image/optimum mode select unit 33 outputs the encoding parameter information to the orthogonal transform unit 14 and the lossless coding unit 16, and outputs the predicted image data to the subtraction unit 13. Further, when selecting either the optimum intra prediction operation or the optimum inter prediction operation as the optimum mode, the predicted image/optimum mode select unit 33 compares the cost function value of the optimum intra prediction operation with the cost function value of the optimum inter prediction operation. Based on the comparison result, the predicted image/optimum mode select unit 33 selects the prediction operation with the smaller cost function value, or the prediction operation with the higher encoding efficiency, as the optimum mode, and outputs the predicted image data generated in the selected optimum mode to the subtraction unit 13. Also, the predicted image/optimum mode select unit 33 outputs the encoding parameter information indicating the prediction operation in the optimum mode to the orthogonal transform unit 14 and the lossless coding unit 16.

<2. Structure of the Orthogonal Transform Unit>

In an intra prediction operation, the pixels in adjacent encoded blocks are used to make a prediction, and the optimum prediction direction is selected from two or more prediction directions. For example, in H.264/AVC, the four modes of prediction mode 0 through prediction mode 3 are set as the prediction modes for blocks of 16×16 pixels. Also, the nine prediction modes of prediction mode 0 through prediction mode 8 are set as the prediction modes for blocks of 8×8 pixels. Further, the nine prediction modes of prediction mode 0 through prediction mode 8 are set as the prediction modes for blocks of 4×4 pixels.

FIG. 2 shows the prediction modes for blocks of 4×4 pixels, for example. In the following, each of the prediction modes shown in FIG. 2 is briefly described. In FIG. 2, the arrows indicate prediction directions.

FIG. 2(A) illustrates the prediction mode 0 (vertical). The prediction mode 0 is a mode for generating predicted values from reference pixels A through D that are adjacent in the vertical direction. FIG. 2(B) illustrates the prediction mode 1 (horizontal). The prediction mode 1 is a mode for generating predicted values from reference pixels I through L that are adjacent in the horizontal direction as indicated by the arrows. FIG. 2(C) illustrates the prediction mode 2 (DC). The prediction mode 2 is a mode for generating predicted values from the reference pixels A through D and I through L that are adjacent in the vertical direction and in the horizontal direction of the block among thirteen reference pixels A through M.

FIG. 2(D) illustrates the prediction mode 3 (diagonal down-left). The prediction mode 3 is a mode for generating predicted values from the reference pixels A through H that are continuous in the horizontal direction among the thirteen reference pixels A through M. FIG. 2(E) illustrates the prediction mode 4 (diagonal down-right). The prediction mode 4 is a mode for generating predicted values from the reference pixels A through D and I through M that are adjacent to the block among the thirteen reference pixels A through M. FIG. 2(F) illustrates the prediction mode 5 (vertical-right). The prediction mode 5 is a mode for generating predicted values from the reference pixels A through D and I through M that are adjacent to the block among the thirteen reference pixels A through M.

FIG. 2(G) illustrates the prediction mode 6 (horizontal-down). The prediction mode 6 is a mode for generating predicted values from the reference pixels A through D and I through M that are adjacent to the block among the thirteen reference pixels A through M, like the prediction mode 4 and the prediction mode 5. FIG. 2(H) illustrates the prediction mode 7 (vertical-left). The prediction mode 7 is a mode for generating predicted values from the four reference pixels A through D that are located above and adjacent to the block, and from the four reference pixels E through G that follow the four reference pixels A through D among the thirteen reference pixels A through M. FIG. 2(I) illustrates the prediction mode 8 (horizontal-up). The prediction mode 8 is a mode for generating predicted values from the four reference pixels I through L that are located on the left side of and adjacent to the block among the thirteen reference pixels A through M.

When predicted values are generated in this manner, there are many cases where a pixel closer to a pixel used in the prediction has a smaller difference (prediction error) from the predicted value among the pixels in the block. Therefore, in a case where the prediction mode 0 (vertical) is selected as the optimum mode as shown in FIG. 3(A), pixels P0 through P3 have smaller prediction errors than pixels P12 through P15, for example. In a case where the prediction mode 1 (horizontal) is selected as shown in FIG. 3(B), pixels P0, P4, P8, and P12 have smaller prediction errors than pixels P3, P7, P11, and P15. In a case where the prediction mode 4 (diagonal down-right) is selected as shown in FIG. 3(C), the pixel P0 has a smaller prediction error than the pixel P15. As described above, prediction errors depend on the prediction modes. As for the block locations in each macroblock, there are many cases where a block closer to an adjacent macroblock that has been encoded has a smaller prediction error, and prediction errors also depend on the block locations in the macroblock. Therefore, the orthogonal transform unit 14 sets an optimum base for each prediction mode and for each location of the blocks to be subjected to orthogonal transforms in the macroblock. In this manner, the orthogonal transform unit 14 optimizes the orthogonal transforms on prediction errors.

In orthogonal transforms, a Karhunen-Loeve transform technique (hereinafter referred to as the KL transform technique) is known as the optimum transform technique to perform transforms in such a manner that transformed coefficients are uncorrelated, or the highest encoding efficiency is achieved. However, to determine the base of a KL transform, it is necessary to generate matrixes based on prediction errors and calculate eigenvectors corresponding to the eigenvalues of the generated matrixes. If the image encoding apparatus calculates the base each time, the amount of calculation in the image encoding apparatus would become larger. If a calculated base is added to an encoded bit stream, the encoding efficiency would become lower. Therefore, an optimum mode for each location of blocks to be orthogonally transformed in each macroblock and for each prediction mode is calculated through learning in advance. Where the calculated bases are used in the image encoding apparatus and an image decoding apparatus, there is no need for the image encoding apparatus and the image decoding apparatus to calculate bases, and the structures of the image encoding apparatus and the image decoding apparatus can be made simpler than those to calculate bases. Furthermore, since there is no need to transmit the bases, the encoding efficiency can be increased by using KL transforms. The learning of bases will be described later.

Figure 4:
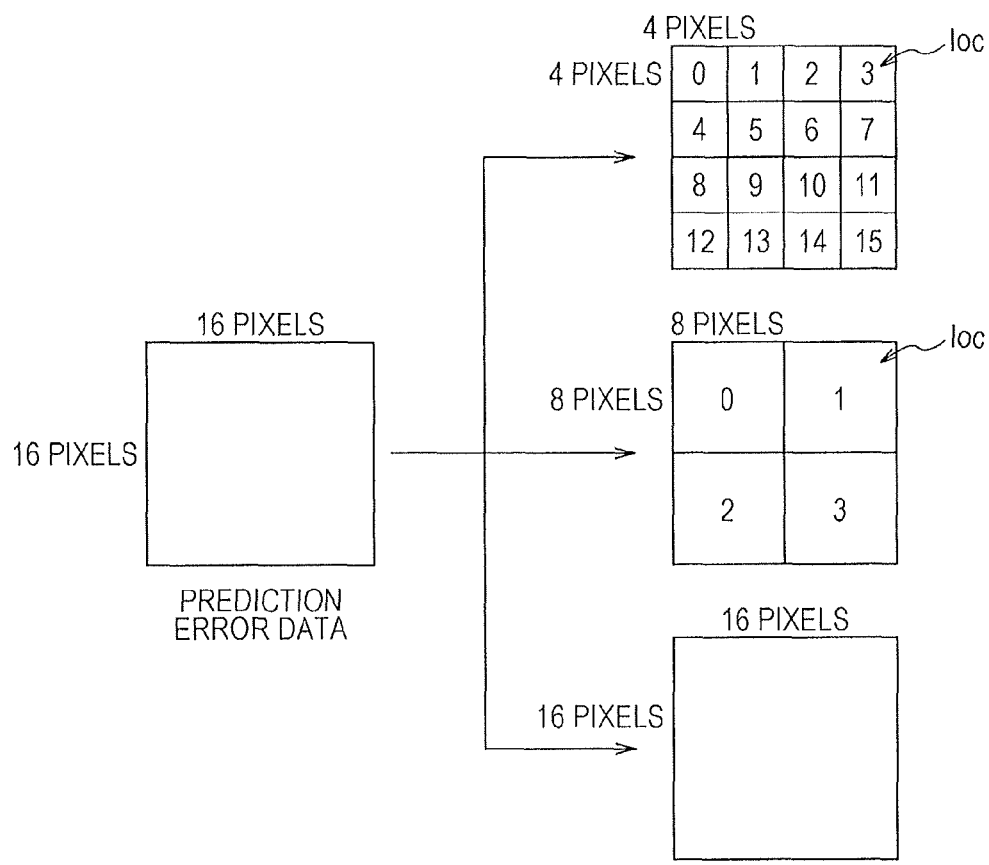
FIG. 4 is a diagram illustrating KL transforms at an orthogonal transform unit.
Figure 4:
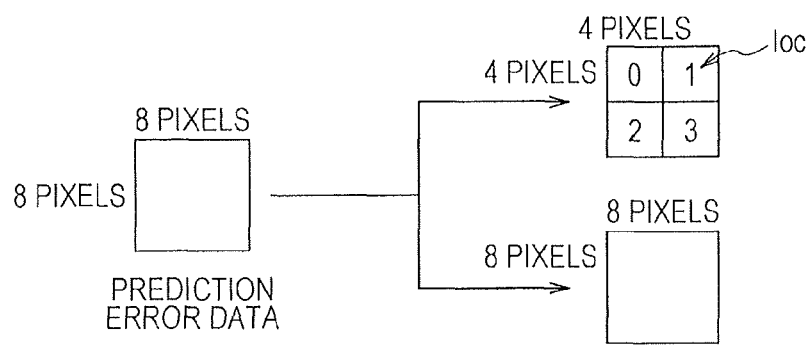

In an intra prediction, where the macroblock is formed with 16×16 pixels, the transform block size that is the block size of the image to be encoded is 16×16 pixels, 8×8 pixels, or 4×4 pixels, for example. Where the macroblock is formed with 8×8 pixels, the transform block size is 8×8 pixels or 4×4 pixels, for example. Therefore, the orthogonal transform unit 14 is designed to be capable of performing KL transforms compatible with the prediction mode in the block size of 16×16 pixels, 8×8 pixels, or 4×4 pixels where the macroblock is formed with 16×16 pixels as shown in FIG. 4. Also, the orthogonal transform unit 14 is designed to be capable of performing KL transforms compatible with the prediction mode in the block size of 8×8 pixels or 4×4 pixels where the macroblock is formed with 8×8 pixels. Further, in a case where there are transform blocks in a macroblock, the orthogonal transform unit 14 performs KL transforms in accordance with each block location loc in the macroblock.

Figure 5:
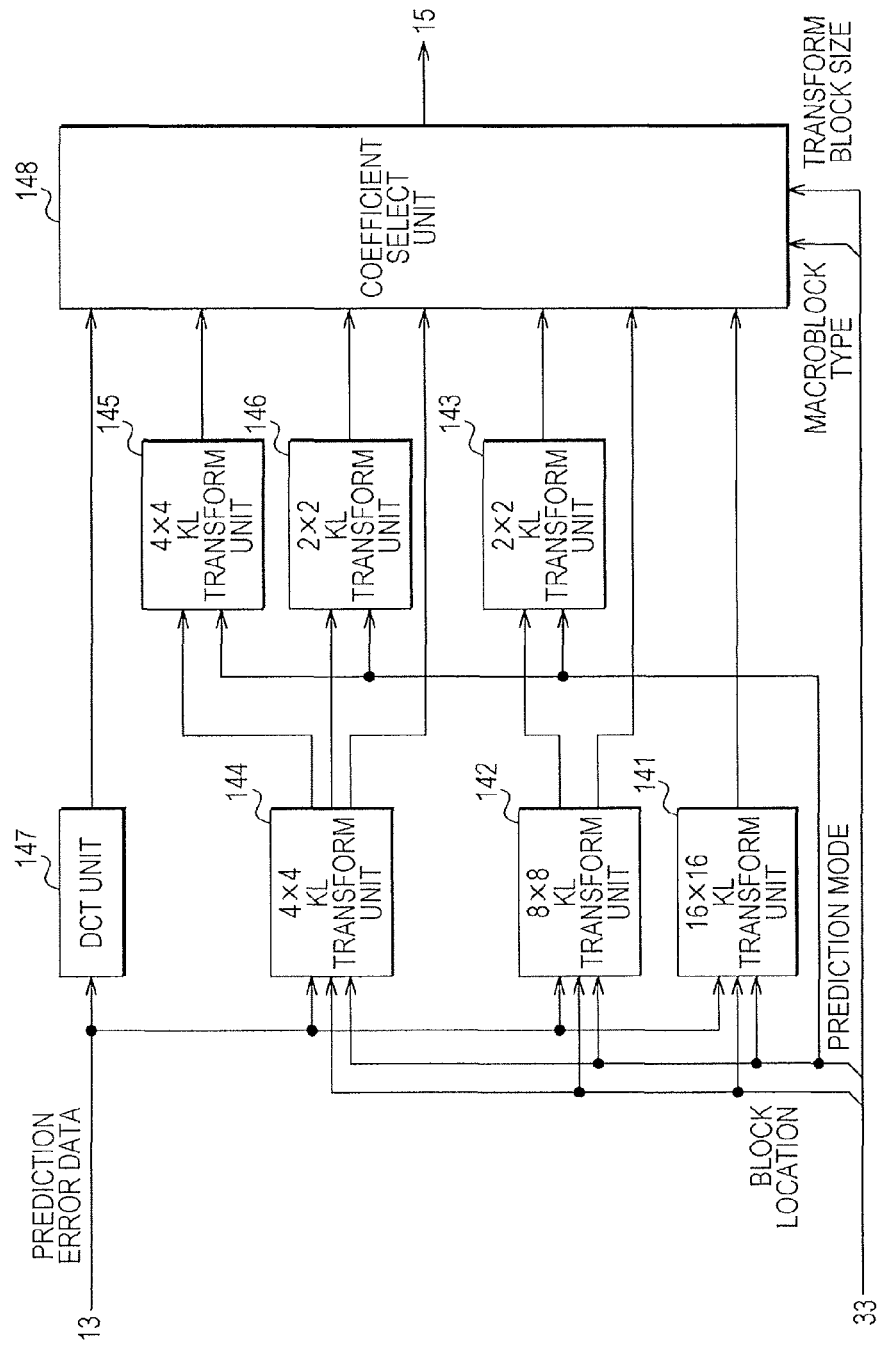
FIG. 5 is a diagram illustrating the structure of the orthogonal transform unit.

FIG. 5 illustrates an example structure of the orthogonal transform unit 14 that uses KL transforms. The orthogonal transform unit 14 includes a 16×16 KL transform unit 141, an 8×8 KL transform unit 142, 2×2 KL transform units 143 and 146, 4×4 KL transform units 144 and 145, a DCT unit 147, and a coefficient select unit 148.

The 16×16 KL transform unit 141 uses the optimum base learned beforehand for each prediction mode, and performs a KL transform on prediction error data for each block of 16×16. The resultant coefficients are output to the coefficient select unit 148.

The 8×8 KL transform unit 142 uses the optimum base learned beforehand for each prediction mode and for each block location in the macroblock, and performs a KL transform on prediction error data for each block of 8×8. Where the prediction error data is data compatible with the block size of 16×16 pixels, each block of 16×16 pixels includes four blocks of 8×8 pixels. Therefore, the 8×8 KL transform unit 142 outputs the coefficient of the lowest frequency component in each block of 8×8 pixels (hereinafter referred to as the "lowest-frequency component coefficient") to the 2×2 KL transform unit 143, and outputs the other coefficients to the coefficient select unit 148. Also, where the prediction error data is data compatible with the block size of 8×8 pixels, the 8×8 KL transform unit 142 performs a KL transform on the prediction error data for each block of 8×8 pixels by using the optimum base learned beforehand for each prediction mode. The 8×8 KL transform unit 142 outputs the coefficients obtained through the KL transforms to the coefficient select unit 148.

Using the base compatible with the prediction mode among the optimum bases learned beforehand for the respective prediction modes, the 2×2 KL transform unit 143 performs a KL transform on the coefficient of each 2×2 block supplied from the 8×8 KL transform unit 142, and outputs the resultant coefficients to the coefficient select unit 148.

The 4×4 KL transform unit 144 uses the optimum base learned beforehand for each prediction mode and for each block location in the macroblock, and performs a KL transform on prediction error data for each block of 4×4 pixels. Where the prediction error data is data compatible with the block size of 16×16 pixels, each block of 16×16 pixels includes sixteen blocks of 4×4 pixels. Therefore, the 4×4 KL transform unit 144 outputs the lowest-frequency component coefficient in each block of 4×4 pixels to the 4×4 KL transform unit 145, and outputs the other coefficients to the coefficient select unit 148. Where the prediction error data is data compatible with the block size of 8×8 pixels, each block of 8×8 pixels includes four blocks of 4×4 pixels. Therefore, the 4×4 KL transform unit 144 outputs the lowest-frequency component coefficient in each block of 4×4 pixels to the 2×2 KL transform unit 146, and outputs the other coefficients to the coefficient select unit 148.

Using the base compatible with a prediction mode designated by the 4×4 KL transform unit 144 among the optimum bases learned beforehand for the respective prediction modes, the 4×4 KL transform unit 145 performs KL transforms on the lowest-frequency component coefficients of the blocks of 4×4 supplied from the 4×4 KL transform unit 144. The 4×4 KL transform unit 145 outputs the coefficients obtained through the KL transforms to the coefficient select unit 148.

Using the base compatible with the prediction mode among the optimum bases learned beforehand for the respective prediction modes, the 2×2 KL transform unit 146 performs KL transforms on the lowest-frequency component coefficients of the 2×2 blocks supplied from the 4×4 KL transform unit 144. The 2×2 KL transform unit 146 outputs the coefficients obtained through the KL transforms to the coefficient select unit 148.

The DCT unit 147 performs discrete cosine transforms on prediction error data, and outputs the resultant coefficients to the coefficient select unit 148.

The coefficient select unit 148 selects coefficients in accordance with the macroblock size and the transform block size, which is the block size corresponding to the prediction error data. Where the macroblock size is 16×16 pixels, the coefficient select unit 148 selects the coefficients output from the 16×16 KL transform unit 141, the coefficients output from the 8×8 KL transform unit 142 and the 2×2 KL transform unit 143, or the coefficients output from the 4×4 KL transform unit 144 and the 4×4 KL transform unit 145, based on the transform block size. The coefficient select unit 148 outputs the selected coefficients to the quantization unit 15.

Where the macroblock size is 8×8 pixels, the coefficient select unit 148 selects the coefficients output from the 8×8 KL transform unit 742 or the coefficients output from the 4×4 KL transform unit 144 and the 2×2 KL transform unit 146, based on the transform block size. The coefficient select unit 148 outputs the selected coefficients to the quantization unit 15. When the encoding parameter information supplied from the predicted image/optimum mode select unit 33 indicates an inter prediction mode, the coefficient select unit 148 outputs the coefficients output from the DCT unit 147 to the quantization unit 15.

<3. Operations of the Image Encoding Apparatus>

Figure 6:
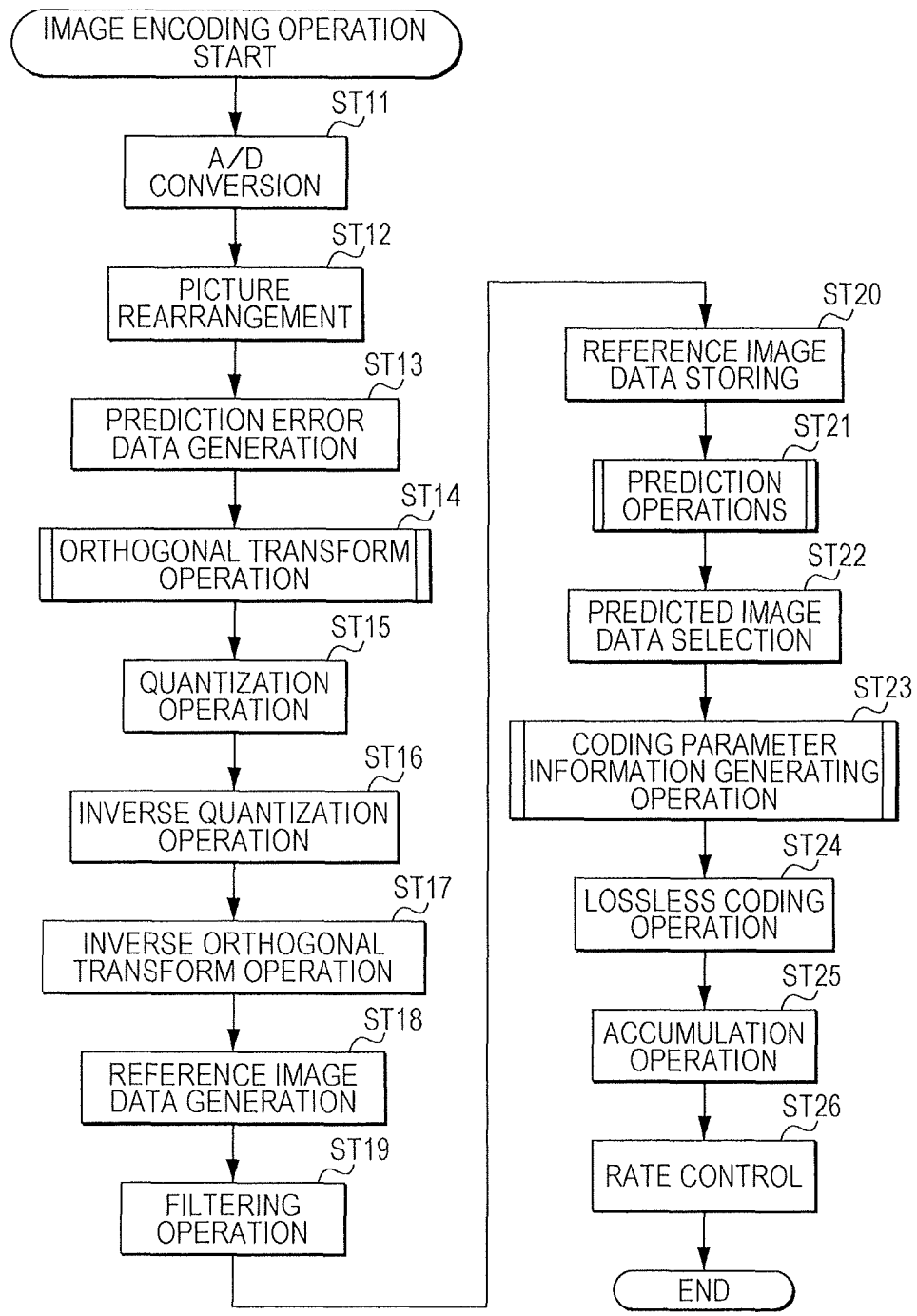
FIG. 6 is a flowchart showing an image encoding operation.

Next, an image encoding operation is described. FIG. 6 is a flowchart showing an image encoding operation. In step ST11, the A/D conversion unit 11 performs an A/D conversion on an input image signal.

In step ST12, the picture rearrangement buffer 12 performs image rearrangement. The picture rearrangement buffer 12 stores the image data supplied from the A/D conversion unit 11, and rearranges the respective pictures in encoding order, instead of display order.

In step ST13, the subtraction unit 13 generates prediction error data. The subtraction unit 13 generates the prediction error data by calculating the differences between the image data of the images rearranged in step ST12 and predicted image data selected by the predicted image/optimum mode select unit 33. The prediction error data has a smaller data amount than the original image data. Accordingly, the data amount can be made smaller than in a case where images are directly encoded.

In step ST14, the orthogonal transform unit 14 performs an orthogonal transform operation. The orthogonal transform unit 14 orthogonally transforms the prediction error data supplied from the subtraction unit 13. The orthogonal transform unit 14 performs orthogonal transforms such as Karhunen-Loeve transforms or discrete cosine transforms on the prediction error data, and outputs coefficient data. Operations of the orthogonal transform unit 14 will be described later in detail.

In step ST15, the quantization unit 15 performs a quantization operation. The quantization unit 15 quantizes the coefficient data. In the quantization, rate control is performed as will be described later in the description of step ST26.

In step ST16, the inverse quantization unit 21 performs an inverse quantization operation. The inverse quantization unit 21 inversely quantizes the coefficient data quantized by the quantization unit 15, having characteristics compatible with the characteristics of the quantization unit 15.

In step ST17, the inverse orthogonal transform unit 22 performs an inverse orthogonal transform operation. The inverse orthogonal transform unit 22 performs an inverse orthogonal transform on the coefficient data inversely quantized by the inverse quantization unit 21, having the characteristics compatible with the characteristics of the orthogonal transform unit 14.

In step ST18, the addition unit 23 generates reference image data. The addition unit 23 generates the reference image data by adding the predicted image data supplied from the predicted image/optimum mode select unit 33 to the data of the block location that corresponds to the predicted image data and has been subjected to the inverse orthogonal transform.

In step ST19, the deblocking filter 24 performs a filtering operation. The deblocking filter 24 removes block distortions by filtering the reference image data output from the addition unit 23.

In step ST20, the frame memory 27 stores the reference image data. The frame memory 27 stores the filtered reference image data.

In step ST21, the intra prediction unit 31 and the motion prediction/compensation unit 32 each perform a prediction operation. Specifically, the intra prediction unit 31 performs intra prediction operations in intra prediction modes, and the motion prediction/compensation unit 32 performs motion prediction/compensation operations in inter prediction modes. The prediction operations will be described later with reference to FIG. 7. In this step, prediction operations are performed in all candidate prediction modes, and cost function values are calculated in all the candidate prediction modes. Based on the calculated cost function values, an optimum intra prediction operation and an optimum inter prediction operation are selected, and the predicted image data generated through the selected predicting operations, the cost functions, and the encoding parameter information are supplied to the predicted image/optimum mode select unit 33.

In step ST22, the predicted image/optimum mode select unit 33 selects predicted image data. Based on the respective cost function values output from the intra prediction unit 31 and the motion prediction/compensation unit 32, the predicted image/optimum mode select unit 33 determines the optimum mode to optimize the encoding efficiency. The predicted image/optimum mode select unit 33 also selects the predicted image data in the determined optimum mode, and supplies the selected predicted image data to the subtraction unit 13 and the addition unit 23. This predicted image data is used in the operations in steps ST13 and ST18, as described above.

In step ST23, the predicted image/optimum mode select unit 33 performs an encoding parameter information generating operation. The predicted image/optimum mode select unit 33 outputs the encoding parameter information about the selected predicted image data as the encoding parameter information about the optimum mode to the orthogonal transform unit 14 and the lossless coding unit 16.

In step ST24, the lossless coding unit 16 performs a lossless coding operation. The lossless coding unit 16 performs lossless coding on the quantized data output from the quantization unit 15. That is, lossless coding such as variable-length coding or arithmetic coding is performed on the quantized data, to compress the data. At this point, the lossless coding is also performed on the encoding parameter information supplied to the lossless coding unit 16 in step ST23 as described above. Further, lossless coding data such as the encoding parameter information is added to the header information in the encoded bit stream generated by performing the lossless coding on the quantized data.

In step ST25, the accumulation buffer 17 performs an accumulation operation. The accumulation buffer 17 stores the encoded bit stream output from the lossless coding unit 16. The encoded bit stream stored in the accumulation buffer 17 is read and transmitted to the decoding side via a transmission path where necessary.

In step ST26, the rate control unit 18 performs rate control. The rate control unit 18 controls the quantization operation rate of the quantization unit 15 so that an overflow or an underflow does not occur in the accumulation buffer 17 when the accumulation buffer 17 stores an encoded bit stream.

Figure 7:
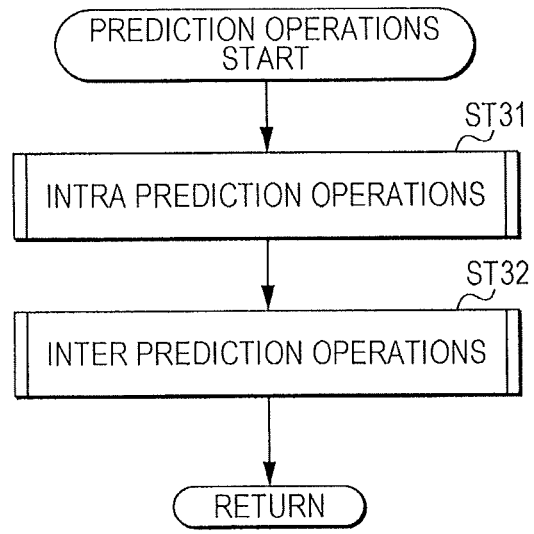
FIG. 7 is a flowchart showing prediction operations.

Referring now to the flowchart of FIG. 7, the prediction operations in step ST21 of FIG. 6 are described.

In step ST31, the intra prediction unit 31 performs intra prediction operations. The intra prediction unit 31 performs intra prediction operations on the image of the current block in all the candidate prediction modes. In the intra prediction operations, the reference image data supplied from the addition unit 23 is used. In the intra predictions, intra prediction operations are performed in the respective prediction modes as will be described later, and the cost function values in the respective prediction modes are calculated. Based on the calculated cost function values, the intra prediction operation with the highest encoding efficiency is selected.

In step ST32, the motion prediction/compensation unit 32 makes inter predictions. Using the filtered reference image data stored in the frame memory 27, the motion prediction/compensation unit 32 performs inter prediction operations in respective motion-compensated block sizes. In the inter predictions, inter prediction operations are performed in the respective motion-compensated block sizes, and the cost function values in the respective prediction blocks. Based on the calculated cost function values, the inter prediction operation with the highest encoding efficiency is selected.

Figure 8:
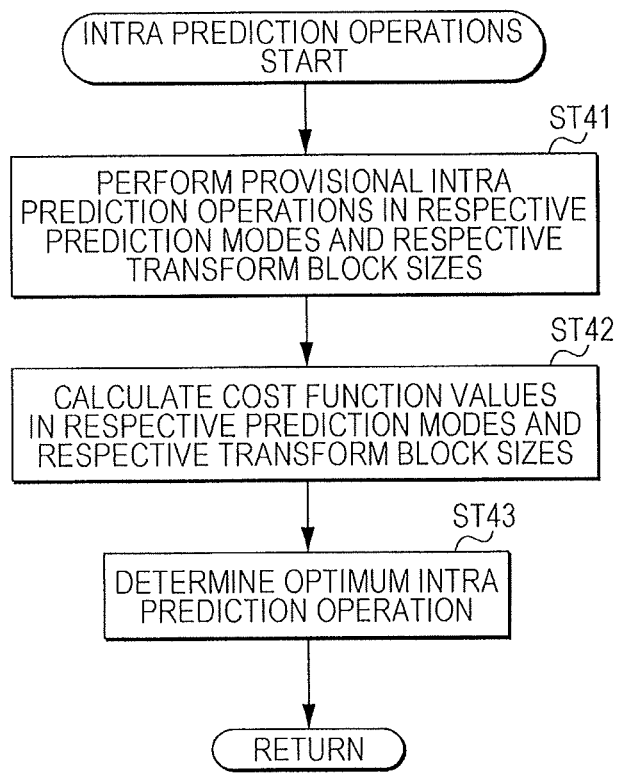
FIG. 8 is a flowchart showing intra prediction operations.

Referring now to the flowchart of FIG. 8, the intra prediction operations in step ST31 of FIG. 7 are described.

In step ST41, the intra prediction unit 31 provisionally performs intra prediction operations in the respective prediction modes and transform block sizes. The intra prediction unit 31 provisionally performs an operation that starts with the generation of predicted image data and the generation of prediction error data and ends with the lossless coding in each prediction mode and each transform block size, using the reference image data supplied from the addition unit 23. In each intra prediction operation, the intra prediction unit 31 outputs the encoding parameter information about the intra prediction operation to the orthogonal transform unit 14 and the lossless coding unit 16.

In step ST42, the intra prediction unit 31 calculates the cost function value in each prediction mode and each transform block size. As specified in the JM (Joint Model), which is the reference software in H.264/AVC, the cost function value is calculated by the technique of High Complexity Mode or Low Complexity Mode.

Specifically, in the High Complexity Mode, the operation that ends with the lossless coding operation is provisionally performed as the operation of the step ST41 in each prediction mode and each transform block size, to calculate the cost function value expressed by the following equation (1) in each prediction mode and each transform block size:

$$\text{Cost}(\text{Mode} \in \Omega) = D + \lambda \cdot R \qquad (1)$$

Here, $\Omega$ represents the universal set of the candidate prediction modes and transform block sizes for encoding the block or the macroblock. D represents the energy difference (distortion) between the reference image and an input image in a case where encoding is performed in a prediction mode and a transform block size. R represents generated encoding amount including orthogonal transform coefficients and encoding parameter information, and $\lambda$ represents the Lagrange multiplier given as the function of a quantization parameter QP.

That is, to perform encoding in the High Complexity Mode, a provisional encoding operation needs to be performed in all the candidate prediction modes and transform block sizes to calculate the above parameters D and R, and therefore, a larger amount of calculation is required.

In the Low Complexity Mode, on the other hand, the generation of a predicted image and the calculation of a header bit such as encoding parameter information are performed as the operation of step ST41 in all the candidate prediction modes and transform block sizes, and the cost function value expressed by the following equation (2) is calculated in each prediction mode:

$$\text{Cost}(\text{Mode} \in \Omega) = D + \text{QPtoQuant}(QP) * \text{Header\_Bit} \quad (2)$$

Here, $\Omega$ represents the universal set of the candidate prediction modes and transform block sizes for encoding the block or the macroblock. D represents the energy difference (distortion) between the reference image and an input image in a case where encoding is performed in a prediction mode and a transform block size. Header_Bit represents the header bit corresponding to the prediction mode and the transform block size, and QPtoQuant is the function given as the function of the quantization parameter QP.

That is, in the Low Complexity Mode, a prediction operation needs to be performed in each prediction mode and each transform block size, but any decoded image is not required. Accordingly, the amount of calculation can be smaller than that required in the High Complexity Mode.

In step ST43, the intra prediction unit 31 determines the optimum intra prediction operation. Based on the cost function values calculated in step ST42, the intra prediction unit 31 selects the one intra prediction operation with the smallest cost function value among the calculated cost function values, and determines the selected intra prediction operation to be the optimum intra prediction operation.

Figure 9:
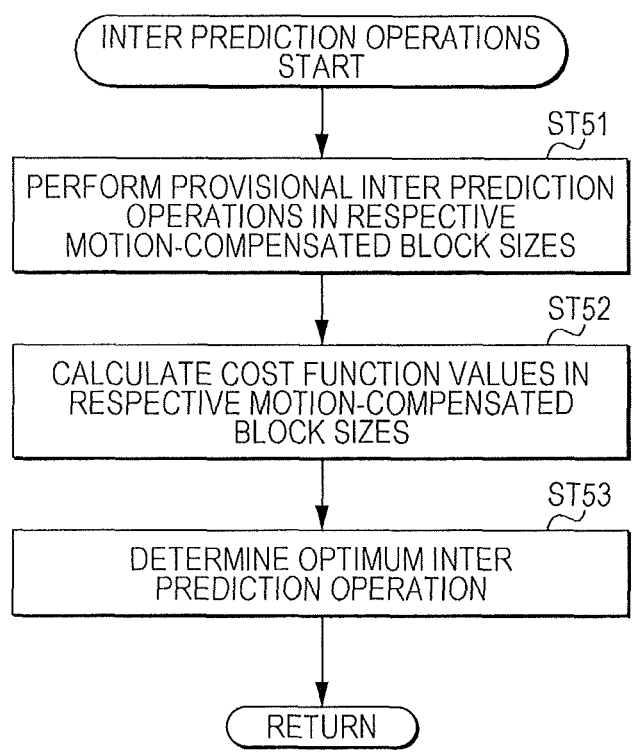
FIG. 9 is a flowchart showing inter prediction operations.

Referring now to the flowchart of FIG. 9, the inter prediction operations in step ST32 of FIG. 7 are described.

In step ST51, the motion prediction/compensation unit 32 provisionally performs an inter prediction operation in each motion-compensated block size. Using the image data of the current block to be encoded and the reference image data, the motion prediction/compensation unit 32 provisionally makes a motion prediction in each motion-compensated block size. Based on the detected motion vectors, the motion prediction/compensation unit 32 performs motion compensation on the reference image data, to generate predicted image data and the like. In each inter prediction operation, the motion prediction/compensation unit 32 outputs the encoding parameter information about the inter prediction operation to the orthogonal transform unit 14 and the lossless coding unit 16.

In step ST52, the motion prediction/compensation unit 32 calculates the cost function value for each motion-compensated block size. Using the above mentioned equation (1) or (2), the motion prediction/compensation unit 32 calculates the cost function values. In the calculation of the cost function values, generated encoding amount including encoding parameter information and the like is used. The cost function value calculation in the inter prediction modes involves the evaluations of cost function values in Skip Mode and Direct Mode specified in H.264/AVC.

In step ST53, the motion prediction/compensation unit 32 determines the optimum inter prediction operation. Based on the cost function values calculated in step ST52, the motion prediction/compensation unit 32 selects the one inter prediction operation with the smallest cost function value among the calculated cost function values, and determines the selected inter prediction operation to be the optimum inter prediction operation.

Figure 10:
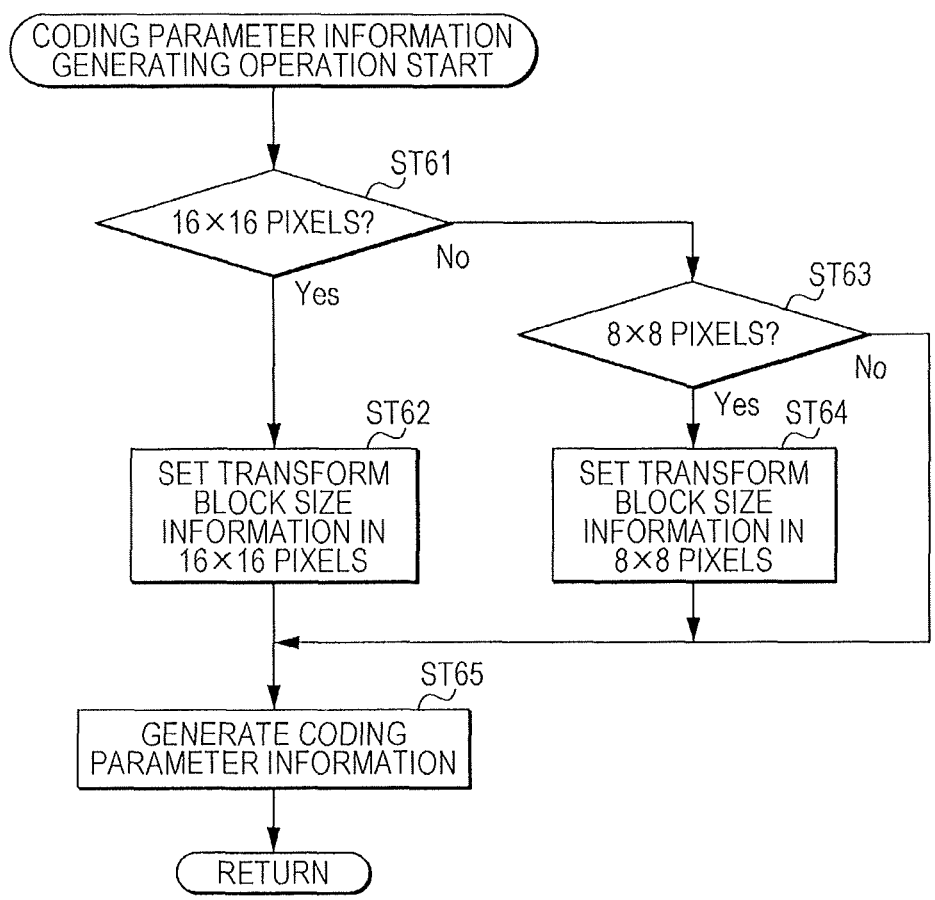
FIG. 10 is a flowchart showing an encoding parameter generating operation.

Referring now to the flowchart in FIG. 10, the encoding parameter information generating operation in step ST23 of FIG. 6 in the case of an intra prediction operation is described. Encoding parameter information is generated by the intra prediction unit 31, as described above. Where the predicted image/optimum mode select unit 33 selects the optimum mode, the encoding parameter information corresponding to the selected prediction operation may be generated by the predicted image/optimum mode select unit 33.

In step ST61, the intra prediction unit 31 determines whether the macroblock size is 16×16 pixels. If the macroblock size is 16×16 pixels, the intra prediction unit 31 moves on to step ST62, and if not 16×16 pixels, moves on to step ST63.

In step ST62, the intra prediction unit 31 sets transform block size information in 16×16 pixels, and moves on to step ST65. Where the transform block size for the orthogonal transform unit 14 to perform KL transforms is 4×4 pixels, the intra prediction unit 31 sets the transform block size information indicating the transform block size to "0". Where the transform block size for the orthogonal transform unit 14 to perform KL transforms is 8×8 pixels, the intra prediction unit 31 sets the transform block size information to "1". Where the transform block size is 16×16 pixels, the intra prediction unit 31 sets the transform block size information to "2".

In step ST63, the intra prediction unit 31 determines whether the macroblock size is 8×8 pixels. If the macroblock size is 8×8 pixels, the intra prediction unit 31 moves on to step ST64, and if not 8×8 pixels, moves on to step ST65.

In step ST64, the intra prediction unit 31 sets transform block size information in 8×8 pixels, and moves on to step ST65. Where the transform block size for the orthogonal transform unit 14 to perform KL transforms is 4×4 pixels, the intra prediction unit 31 sets the transform block size information to "0". Where the transform block size for the orthogonal transform unit 14 to perform KL transforms is 8×8 pixels, the intra prediction unit 31 sets the transform block size information to "1".

In step ST65, the intra prediction unit 31 generates the encoding parameter information. The intra prediction unit 31 forms the encoding parameter information, using the information indicating that the prediction is an intra prediction, the macroblock size, the transform block size information, the prediction mode, the block location in the macroblock, and the like.

Figure 11:
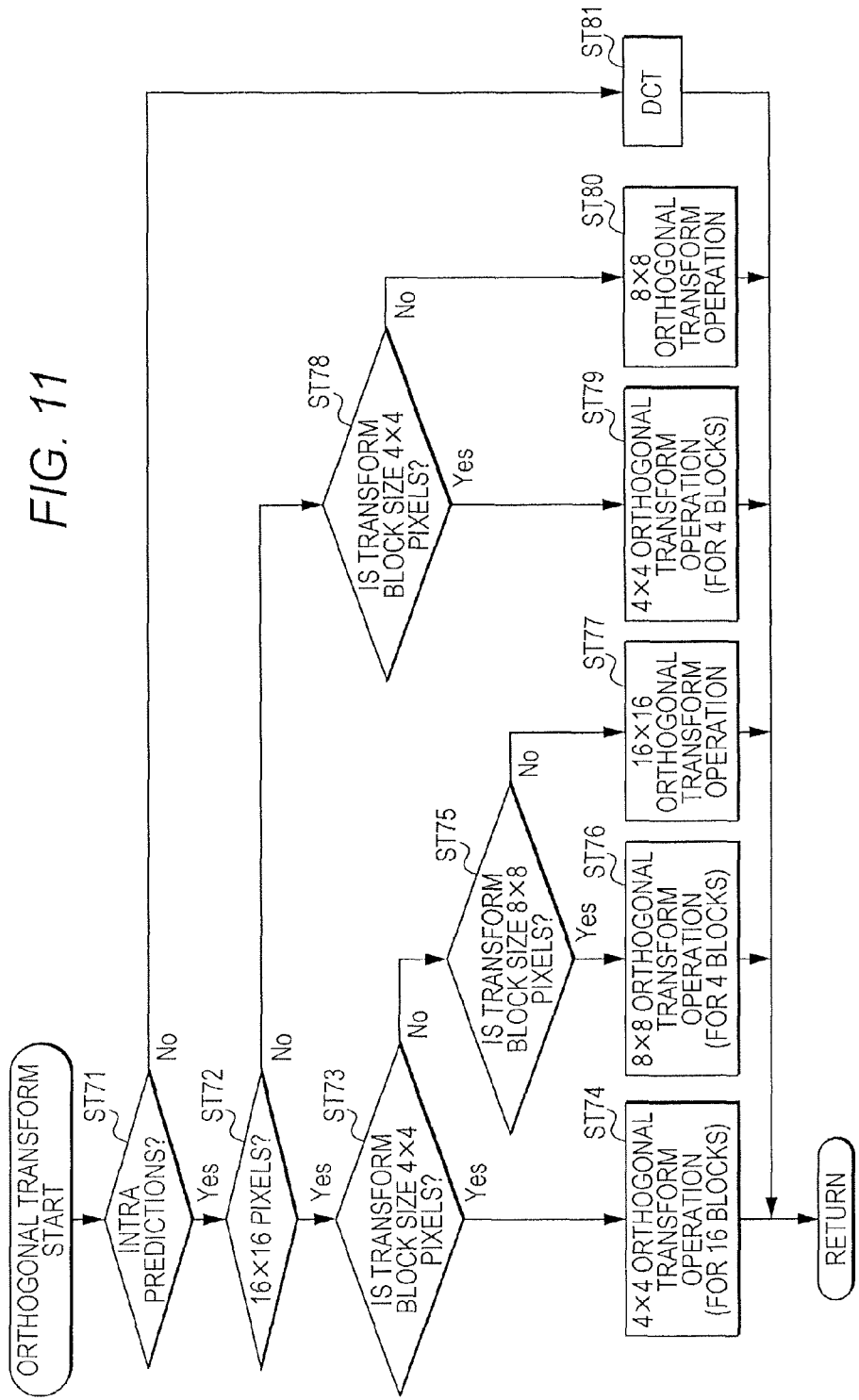
FIG. 11 is a flowchart showing an orthogonal transform operation.

Referring now to the flowchart in FIG. 11, the orthogonal transform operation is described. In step ST71, the orthogonal transform unit 14 determines whether there are intra predictions. If the encoding parameter information indicates intra predictions, the orthogonal transform unit 14 moves on to step ST72, and if not intra predictions, moves on to step ST81.

In step ST72, the orthogonal transform unit 14 determines whether the macroblock size is 16×16 pixels. If the encoding parameter information indicates that the macroblock size is 16×16 pixels, the orthogonal transform unit 14 moves on to step ST73, and if not 16×16 pixels, moves on to step ST78.

In step ST73, the orthogonal transform unit 14 determines whether the transform block size is 4×4 pixels. If the encoding parameter information indicates that the transform block size is 4×4 pixels, the orthogonal transform unit 14 moves on to step ST74, and if not 4×4 pixels, moves on to step ST75.

In step ST74, the orthogonal transform unit 14 performs a 4×4 orthogonal transform operation. Using the bases learned beforehand in accordance with the prediction mode and the block locations, the orthogonal transform unit 14 performs a KL transform on each block of 4×4 pixels. Since a block of 16×16 pixels includes sixteen blocks of 4×4 pixels, a KL transform is performed sixteen times herein. Further, the orthogonal transform unit 14 selects the lowest-frequency component coefficients from the coefficients obtained by performing the KL transforms on the blocks of 4×4 pixels, and performs KL transforms on the selected 4×4 coefficients by using the base compatible with the prediction mode. The orthogonal transform unit 14 outputs the coefficients obtained by performing the KL transforms on the lowest-frequency component coefficients, and the coefficients other than the lowest-frequency component coefficients, to the quantization unit 15. That is, the coefficient select unit 148 of the orthogonal transform unit 14 shown in FIG. 5 selects the coefficients output from the 4×4 KL transform units 144 and 146, and outputs the selected coefficients to the quantization unit 15.

In step ST75, the orthogonal transform unit 14 determines whether the transform block size is 8×8 pixels. If the encoding parameter information indicates that the transform block size is 8×8 pixels, the orthogonal transform unit 14 moves on to step ST76, and if not 8×8 pixels, moves on to step ST77.

In step ST76, the orthogonal transform unit 14 performs an 8×8 orthogonal transform operation. Using the bases learned beforehand in accordance with the prediction mode and the block locations, the orthogonal transform unit 14 performs a KL transform on each block of 8×8 pixels. Since a block of 16×16 pixels includes four blocks of 8×8 pixels, a KL transform is performed four times herein. Further, the orthogonal transform unit 14 selects the lowest-frequency component coefficients from the coefficients obtained by performing the KL transforms on the blocks of 8×8 pixels, and performs KL transforms on the selected 2×2 coefficients by using the base compatible with the prediction mode. The orthogonal transform unit 14 outputs the coefficients obtained by performing the KL transforms on the lowest-frequency component coefficients, and the coefficients other than the lowest-frequency component coefficients, to the quantization unit 15. That is, the coefficient select unit 148 of the orthogonal transform unit 14 shown in FIG. 5 selects the coefficients output from the 8×8 KL transform unit 142 and the 2×2 KL transform unit 143, and outputs the selected coefficients to the quantization unit 15.

In step ST77, the orthogonal transform unit 14 performs a 16×16 orthogonal transform operation. Using the base learned beforehand in accordance with the prediction mode, the orthogonal transform unit 14 performs a KL transform on the block of 16×16 pixels, and outputs the resultant coefficients to the quantization unit 15. That is, the coefficient select unit 148 of the orthogonal transform unit 14 shown in FIG. 5 selects the coefficients output from the 16×16 KL transform unit 141, and outputs the selected coefficients to the quantization unit 15.

When moving from step ST72 on to step ST78, the orthogonal transform unit 14 determines whether the transform block size is 4×4 pixels. If the encoding parameter information indicates that the transform block size is 4×4 pixels, the orthogonal transform unit 14 moves on to step ST79, and if not 4×4 pixels, moves on to step ST80.

In step ST79, the orthogonal transform unit 14 performs a 4×4 orthogonal transform operation. Using the bases learned beforehand in accordance with the prediction mode and the block locations, the orthogonal transform unit 14 performs a KL transform on each block of 4×4 pixels. Since a block of 8×8 pixels includes four blocks of 4×4 pixels, a KL transform is performed four times herein. Further, the lowest-frequency component coefficients are selected from the coefficients obtained through the KL transforms performed on the blocks of 4×4 pixels, and KL transforms are performed on the selected 2×2 coefficients by using the base compatible with the prediction mode. The orthogonal transform unit 14 outputs the coefficients obtained by performing the KL transforms on the lowest-frequency component coefficients, and the coefficients other than the lowest-frequency component coefficients, to the quantization unit 15. That is, the coefficient select unit 148 of the orthogonal transform unit 14 shown in FIG. 5 selects the coefficients output from the 4×4 KL transform units 144 and the 2×2 KL transform unit 146, and outputs the selected coefficients to the quantization unit 15.

In step ST80, the orthogonal transform unit 14 performs an orthogonal transform on each block of 8×8 pixels. Using the base learned beforehand in accordance with the prediction mode, the orthogonal transform unit 19 performs a KL transform on the block of 8×8 pixels, and outputs the resultant coefficients to the quantization unit 15. That is, the coefficient select unit 148 of the orthogonal transform unit 14 shown in FIG. 5 selects the coefficients output from the 8×8 KL transform unit 142, and outputs the selected coefficients to the quantization unit 15.

In step ST81, the orthogonal transform unit 19 performs discrete cosine transforms (DCT). The orthogonal transform unit 14 outputs the coefficients obtained through the discrete cosine transforms to the quantization unit 15. That is, the coefficient select unit 148 of the orthogonal transform unit 14 shown in FIG. 5 selects the coefficients output from the DCT unit 147, and outputs the selected coefficients to the quantization unit 15.

Figure 12:
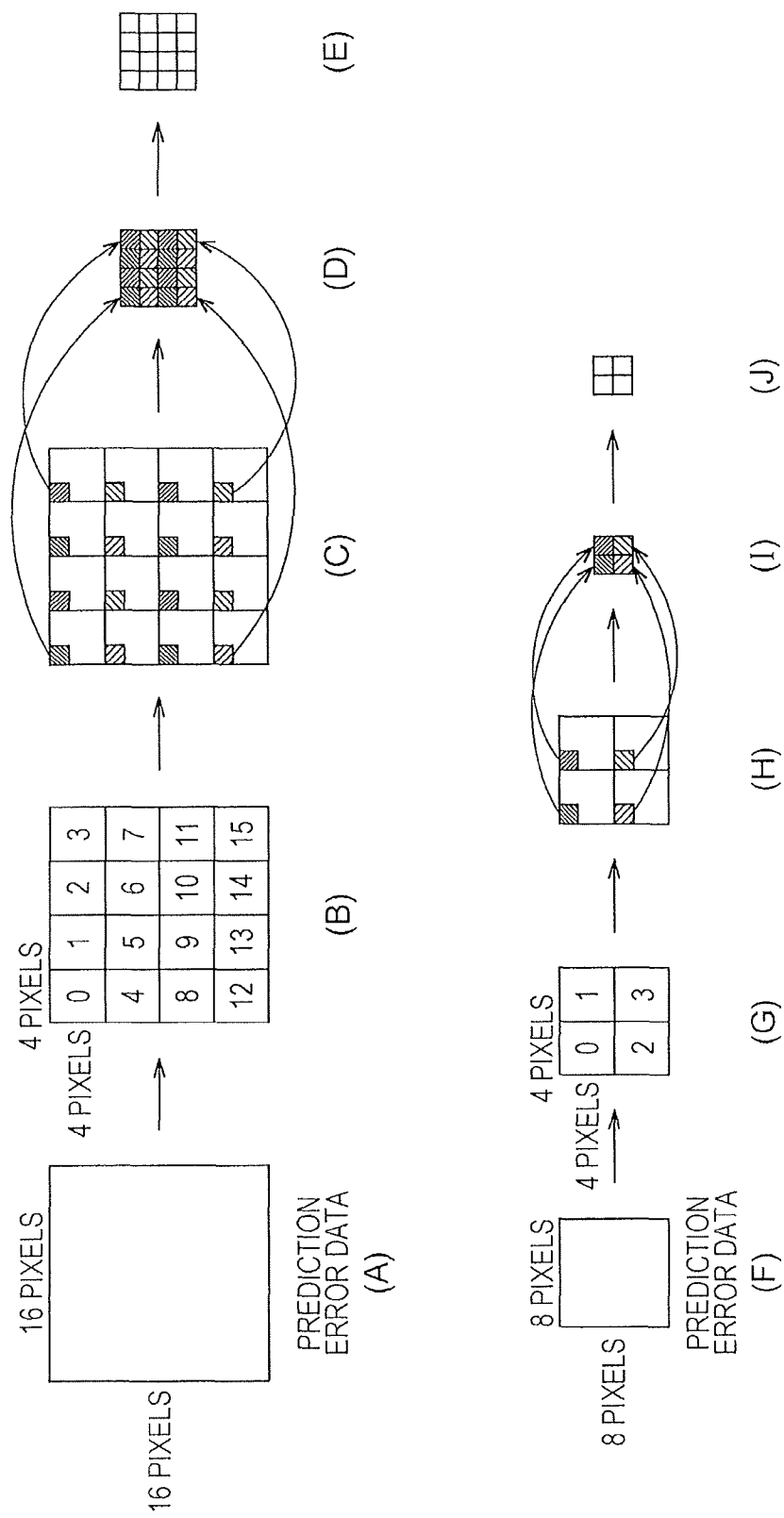
FIG. 12 are diagrams for explaining orthogonal transform operations.

FIG. 12 are diagrams for explaining the orthogonal transform operation. Where the macroblock size is 16×16 pixels as shown in FIG. 12(A) and the transform block size is 4×4 pixels, sixteen transform blocks are contained in the macroblock as shown in FIG. 12(B). It should be noted that the numbers in the blocks represent the block locations loc. Using the base optimized for the prediction mode and block location of each block, the 4×4 KL transform unit 144 of the orthogonal transform unit 14 performs a KL transform on each transform block, to generate the coefficients of the respective blocks as shown in FIG. 12(C). Further, using the lowest-frequency component coefficients (indicated by the shaded portions) in the respective blocks, the 4×4 KL transform unit 145 forms a 4×4 block as shown in FIG. 12(D). Using the base optimized in accordance with the prediction mode, the 4×4 KL transform unit 145 performs a KL transform on this block, and generates the coefficient of each block as shown in FIG. 12(E). The orthogonal transform unit 14 outputs the coefficients shown in FIG. 12(E), and the coefficients other than the lowest-frequency component coefficients in FIG. 12(C), to the quantization unit 15.

Where the macroblock size is 8×8 pixels as shown in FIG. 12(F) and the transform block size is 4×4 pixels, four transform blocks are contained in the macroblock as shown in FIG. 12(G). It should be noted that the numbers in the blocks represent the block locations loc. Using the base optimized for the prediction mode and block location of each block, the 4× 4 KL transform unit 144 of the orthogonal transform unit 14 performs a KL transform on each transform block, to generate the coefficients of the respective blocks as shown in FIG. 12(H). Further, using the lowest-frequency component coefficients (indicated by the shaded portions) in the respective blocks, the 2×2 KL transform unit 146 forms a 2×2 block as shown in FIG. 12(I). Using the base optimized in accordance with the prediction mode, the 2×2 KL transform unit 146 performs a KL transform on this block, and generates the coefficient of each block as shown in FIG. 12(J). The orthogonal transform unit 14 outputs the coefficients shown in FIG. 12(J), and the coefficients other than the lowest-frequency component coefficients in FIG. 12(H), to the quantization unit 15.

As described above, with the image encoding apparatus and method of the present invention, the bases that are set beforehand in accordance with the block locations of the transform blocks in a macroblock are used to perform orthogonal transforms at the time of image data encoding. Accordingly, transforms optimized in accordance with the block locations can be performed, and encoding efficiency can be increased. Also, the bases that are set beforehand in accordance not only with the block locations but also with the prediction modes are used to perform orthogonal transforms that are optimized to a greater extent. Accordingly, the encoding efficiency can be further increased. As the encoding efficiency is increased, the image quality can be improved without an increase in the encoded bit stream data amount, for example.

<4. Structure of an Image Decoding Apparatus>

An encoded bit stream generated by encoding an input image is supplied to an image decoding apparatus via a predetermined transmission path or a recording medium or the like, and is decoded therein.

Figure 13:
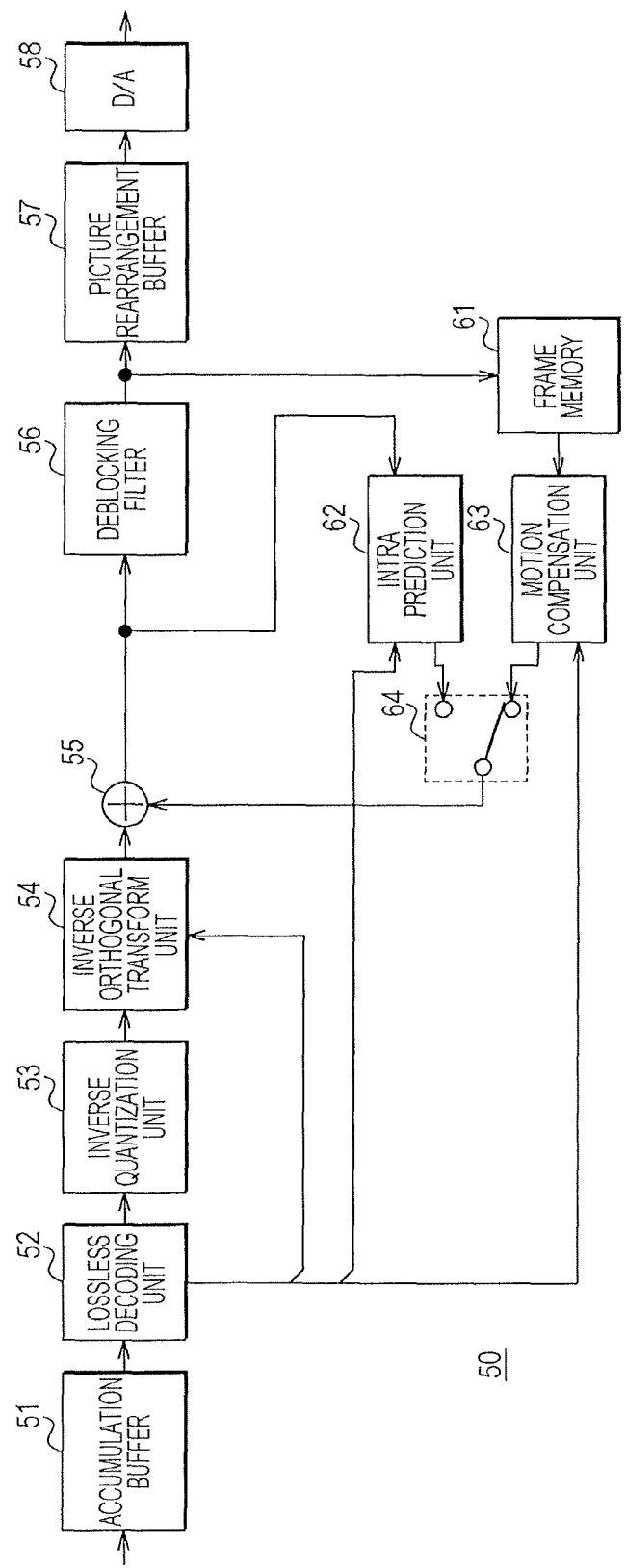
FIG. 13 is a diagram illustrating the structure of an image decoding apparatus.

FIG. 13 illustrates the structure of the image decoding apparatus. The image decoding apparatus 50 includes an accumulation buffer 51, a lossless decoding unit 52, an inverse quantization unit 53, an inverse orthogonal transform unit 54, an addition unit 55, a deblocking filter 56, a picture rearrangement buffer 57, and a digital/analog conversion unit (D/A conversion unit) 58. The image decoding apparatus 50 further includes a frame memory 61 an intra prediction unit 62, a motion compensation unit 63, and a selector 64.

The accumulation buffer 51 stores a transmitted encoded bit stream. The lossless decoding unit 52 decodes the encoded bit stream supplied from the accumulation buffer 51 by a technique compatible with the encoding technique used by the lossless coding unit 16 of FIG. 1.

The lossless decoding unit 52 decodes the header information in the encoded bit stream, and outputs the resultant encoding parameter information to the intra prediction unit 62, the motion compensation unit 63, and the deblocking filter 56. Using the motion vectors of the block to be decoded and decoded adjacent blocks, the lossless decoding unit 52 sets predicted motion vector candidates. Based on the predicted motion vector select information obtained by performing lossless decoding on the encoded bit stream, the lossless decoding unit 52 selects motion vectors from the predicted motion vector candidates, and sets the selected motion vectors as predicted motion vectors. The lossless decoding unit 52 adds the predicted motion vectors to motion vector differences obtained by performing lossless decoding on the encoded bit stream, and calculates and outputs the motion vectors of the block to be decoded to the motion compensation unit 63.

The inverse quantization unit 53 inversely quantizes the quantized data decoded by the lossless decoding unit 52, using a technique compatible with the quantization technique used by the quantization unit 15 of FIG. 1. The inverse orthogonal transform unit 54 performs an inverse orthogonal transform on the output from the inverse quantization unit 53 by a technique compatible with the orthogonal transform technique used by the orthogonal transform unit 14 of FIG. 1, and outputs the result to the addition unit 55.

The addition unit 55 generates decoded image data by adding the data subjected to the inverse orthogonal transform to predicted image data supplied from the selector 64, and outputs the decoded image data to the deblocking filter 56 and the intra prediction unit 62.

The deblocking filter 56 performs filtering on the decoded image data supplied from the addition unit 55, and removes block distortions. The resultant data is supplied to and stored into the frame memory 61, and is also output to the picture rearrangement buffer 57.

The picture rearrangement buffer 57 performs image rearrangement. Specifically, the frame order rearranged in the order of encoding performed by the picture rearrangement buffer 12 of FIG. 1 is rearranged in the original display order, and is output to the D/A conversion unit 58.

The D/A conversion unit 58 performs a D/A conversion on the image data supplied from the picture rearrangement buffer 57, and outputs the converted image data to a display (not shown) to display the images.

The frame memory 61 holds the decoded image data that has been subjected to the filtering operation and is supplied from the deblocking filter 24.

Based on the encoding parameter information supplied from the lossless decoding unit 52, the intra prediction unit 62 generates predicted images, and outputs the generated predicted image data to the selector 64.

Based on the encoding parameter information and motion vectors supplied from the lossless decoding unit 52, the motion compensation unit 63 performs motion compensation, to generate and output predicted image data to the selector 64. Specifically, based on the motion vectors supplied from the lossless decoding unit 52 and reference frame information, the motion compensation unit 63 performs motion compensation using the motion vectors on the reference image indicated by the reference frame information, and generates predicted image data of a motion-compensated block size.

The selector 64 supplies the predicted image data generated by the intra prediction unit 62 to the addition unit 55. The selector 64 also supplies the predicted image data generated by the motion compensation unit 63 to the addition unit 55.

<5. Structure of the Inverse Orthogonal Transform Unit>

Figure 14:
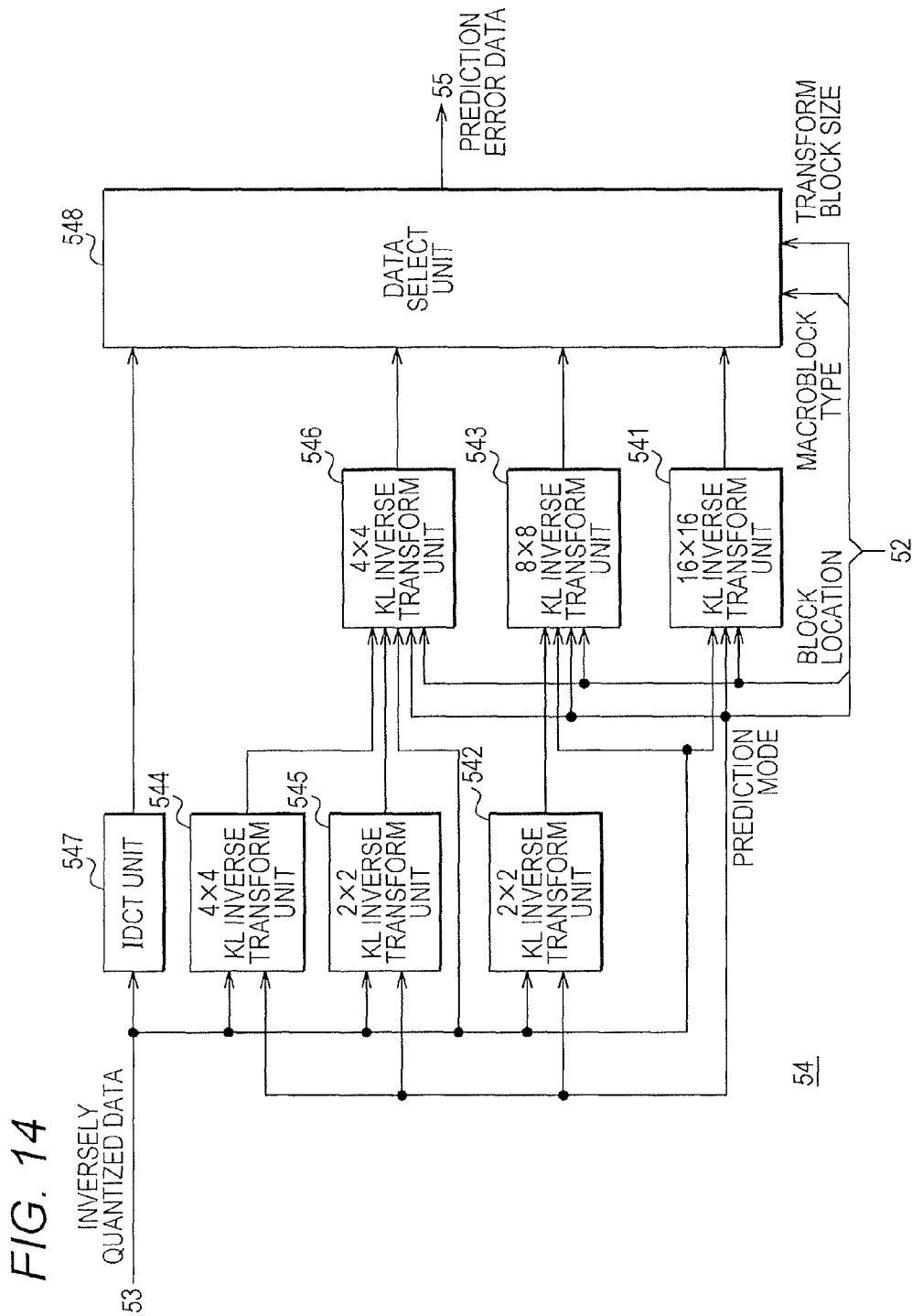
FIG. 14 is a diagram illustrating the structure of an inverse orthogonal transform unit.

FIG. 14 illustrates the structure of the inverse orthogonal transform unit 54. The inverse orthogonal transform unit 54 includes a 16×16 KL inverse transform unit 541, 2×2 KL inverse transform units 542 and 545, an 8×8 KL inverse transform unit 543, 4×4 KL inverse transform units 544 and 546, an IDCT unit 547, and a data select unit 548.

The 16×16 KL inverse transform unit 541 performs KL inverse transforms corresponding to the KL transforms performed by the 16×16 KL transform unit 141 shown in FIG. 5. Using the base compatible with the prediction mode (optimum prediction mode) indicated by the encoding parameter information about the optimum mode supplied from the lossless decoding unit 52, the 16×16 KL inverse transform unit 541 performs KL inverse transforms on inversely quantized data output from the inverse quantization unit 53. The 16×16 KL inverse transform unit 541 outputs the image data obtained by performing the KL inverse transforms to the data select unit 548.

The 2×2 KL inverse transform unit 542 performs KL inverse transforms corresponding to the KL transforms performed by the 2×2 KL transform unit 143 shown in FIG. 5. Using the base compatible with the prediction mode indicated by the optimum mode encoding parameter information, the 2×2 KL inverse transform unit 542 performs KL inverse transforms on the inversely quantized data output from the inverse quantization unit 53. The 2× 2 KL inverse transform unit 542 outputs the lowest-frequency component coefficients obtained by performing the KL inverse transforms to the 8×8 KL inverse transform unit 543.

The 8×8 KL inverse transform unit 543 performs KL inverse transforms corresponding to the KL transforms performed by the 8×8 KL transform unit 143 shown in FIG. 5. Based on the optimum mode encoding parameter information supplied from the lossless decoding unit 52, the 8×8 KL inverse transform unit 543 performs KL inverse transforms. Where the macroblock size is 16×16 pixels, for example, the 8×8 KL inverse transform unit 543 performs KL inverse transforms on the lowest-frequency component coefficients output from the 2×2 KL inverse transform unit 542 and on the inversely quantized data output from the inverse quantization unit 53, using the bases compatible with the prediction mode indicated by the optimum mode encoding parameter information and the block locations. The 8×8 KL inverse transform unit 543 outputs the image data obtained by performing the KL inverse transforms to the data select unit 548. Where the macroblock size is 8×8 pixels, the 8×8 KL inverse transform unit 543 performs KL inverse transforms on the inversely quantized data output from the inverse quantization unit 53, using the bases compatible with the prediction mode and the block locations. The resultant image data is output to the data select unit 548.

The 4×4 KL inverse transform unit 544 performs KL inverse transforms corresponding to the KL transforms performed by the 4×4 KL transform unit 145 shown in FIG. 5. Using the base compatible with the prediction mode indicated by the optimum mode encoding parameter information, the 4×4 KL inverse transform unit 544 performs KL inverse transforms on the inversely quantized data output from the inverse quantization unit 53. The 4× 4 KL inverse transform unit 544 outputs the lowest-frequency component coefficients obtained by performing the KL inverse transforms to the 4×4 KL inverse transform unit 546.

The 2×2 KL inverse transform unit 545 performs KL inverse transforms corresponding to the KL transforms performed by the 2×2 KL transform unit 146 shown in FIG. 5. Using the base compatible with the prediction mode indicated by the optimum mode encoding parameter information, the 2×2 KL inverse transform unit 545 performs KL inverse transforms on the inversely quantized data output from the inverse quantization unit 53. The 2× 2 KL inverse transform unit 545 outputs the lowest-frequency component coefficients obtained by performing the KL inverse transforms to the 4×4 KL inverse transform unit 546.

The 4×4 KL inverse transform unit 546 performs KL inverse transforms corresponding to the KL transforms performed by the 4×4 KL transform unit 144 shown in FIG. 5. Based on the optimum mode encoding parameter information supplied from the lossless decoding unit 52, the 4×4 KL inverse transform unit 546 performs KL inverse transforms. Where the macroblock size is 16×16 pixels, for example, the 4×4 KL inverse transform unit 546 performs KL inverse transforms on the lowest-frequency component coefficients output from the 4×4 KL inverse transform unit 544 and on the inversely quantized data output from the inverse quantization unit 53, using the bases compatible with the prediction mode indicated by the optimum mode encoding parameter information and the block locations. The 4×4 KL inverse transform unit 546 outputs the image data obtained by performing the KL inverse transforms to the data select unit 548. Where the macroblock size is 8×8 pixels, the 4×4 KL inverse transform unit 546 performs KL inverse transforms on the lowest-frequency component coefficients output from the 2× 2 KL inverse transform unit 545 and on the inversely quantized data output from the inverse quantization unit 53, using the bases compatible with the prediction mode and the block locations. The 4×4 KL inverse transform unit 546 outputs the image data obtained by performing the KL inverse transforms to the data select unit 548.

Using the inversely quantized data output from the inverse quantization unit 53, the IDCT unit 547 performs inverse discrete cosine transforms, and outputs the resultant image data to the data select unit 548.

Based on the encoding parameter information, the data select unit 548 selects image data from the image data output from the 16×16 KL inverse transform unit 541, the 8×8 KL inverse transform unit 543, the 4×4 KL inverse transform unit 546, and the IDCT unit 547. The data select unit 548 outputs the selected image data as prediction error data to the addition unit 55.

<6. Operations of the Image Decoding Apparatus>

Figure 15:
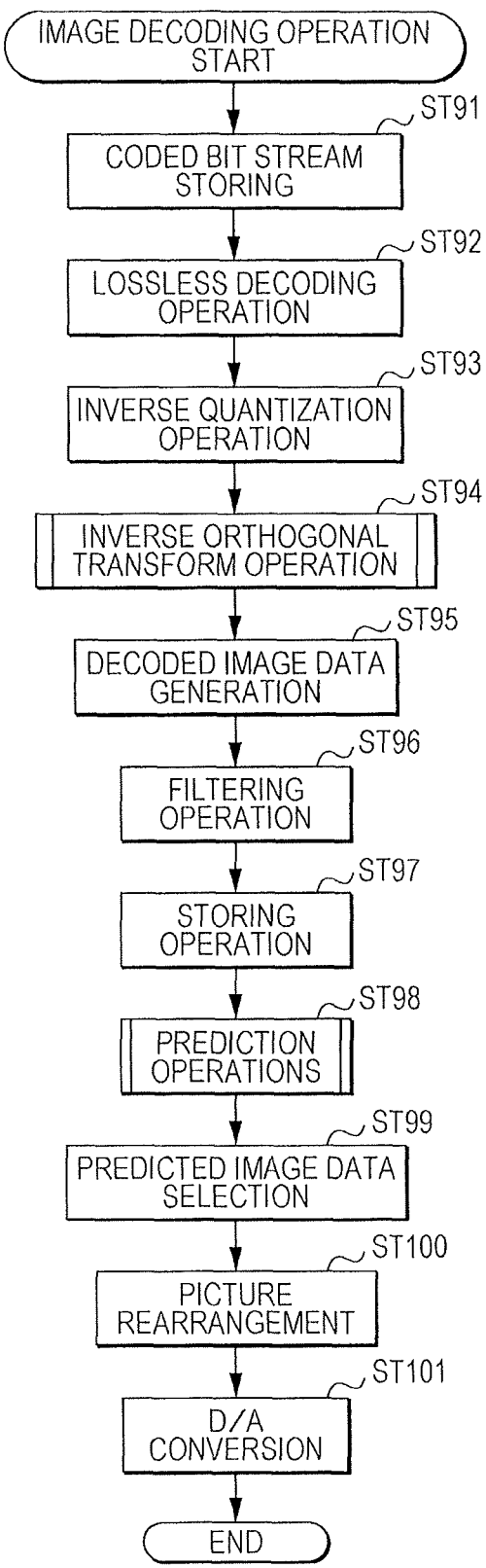
FIG. 15 is a flowchart showing an image decoding operation.

Referring now to the flowchart in FIG. 15, an image decoding operation to be performed by the image decoding apparatus 50 is described.

In step ST91, the accumulation buffer 51 stores a transmitted encoded bit stream. In step ST92, the lossless decoding unit 52 performs a lossless decoding operation. The lossless decoding unit 52 decodes the encoded bit stream supplied from the accumulation buffer 51. Specifically, the quantized data of each picture encoded by the lossless coding unit 16 of FIG. 1 is obtained. The lossless decoding unit 52 performs lossless decoding on the encoding parameter information contained in the header information in the encoded bit stream, and supplies the resultant encoding parameter information to the deblocking filter 56 and the selector 64. Further, in a case where the encoding parameter information is information about an intra prediction mode, the lossless decoding unit 52 outputs the encoding parameter information to the intra prediction unit 62. In a case where the encoding parameter information is information about an inter prediction mode, the lossless decoding unit 52 outputs the encoding parameter information to the motion compensation unit 63.

In step ST93, the inverse quantization unit 53 performs an inverse quantization operation. The inverse quantization unit 53 inversely quantizes the quantized data decoded by the lossless decoding unit 52, having characteristics compatible with the characteristics of the quantization unit 15 of FIG. 1.

In step ST94, the inverse orthogonal transform unit 54 performs an inverse orthogonal transform operation. The inverse orthogonal transform unit 54 performs inverse orthogonal transforms compatible with the orthogonal transforms performed by the orthogonal transform unit 14 of FIG. 1, on the inversely quantized data supplied from the inverse quantization unit 53.

In step ST95, the addition unit 55 generates decoded image data. The addition unit 55 adds the prediction error data obtained through the inverse orthogonal transform operation to predicted image data selected in step ST99, which will be described later, and generates the decoded image data. In this manner, the original images are decoded.

In step ST96, the deblocking filter 56 performs a filtering operation. The deblocking filter 56 performs filtering on the decoded image data output from the addition unit 55, and removes block distortions contained in the decoded images.

In step ST97, the frame memory 61 performs a decoded image data storing operation.

In step ST98, the intra prediction unit 62 and the motion compensation unit 63 performs prediction operations. The intra prediction unit 62 and the motion compensation unit 63 each perform prediction operations in accordance with the encoding parameter information supplied from the lossless decoding unit 52.

Specifically, in a case where the encoding parameter information supplied from the lossless decoding unit 52 indicates intra predictions, the intra prediction unit 62 performs an intra prediction operation based on the encoding parameter information, to generate predicted image data. In a case where the encoding parameter information supplied from the lossless decoding unit 52 indicates inter predictions, the motion compensation unit 63 performs motion compensation based on the encoding parameter information, to generate predicted image data.

In step ST99, the selector 64 selects predicted image data. Specifically, the selector 64 selects predicted image data supplied from the intra prediction unit 62 and predicted image data generated by the motion compensation unit 63, and supplies the selected predicted image data to the addition unit 55, which adds the selected predicted image data to the output from the inverse orthogonal transform unit 54 in step ST95, as described above.

In step ST100, the picture rearrangement buffer 57 performs image rearrangement. Specifically, the order of frames rearranged for encoding by the picture rearrangement buffer 12 of the image encoding apparatus 10 of FIG. 1 is rearranged in the original display order by the picture rearrangement buffer 57.

In step ST101, the D/A conversion unit 58 performs a D/A conversion on the image data supplied from the picture rearrangement buffer 57. The images are output to the display (not shown), and are displayed.

Figure 16:
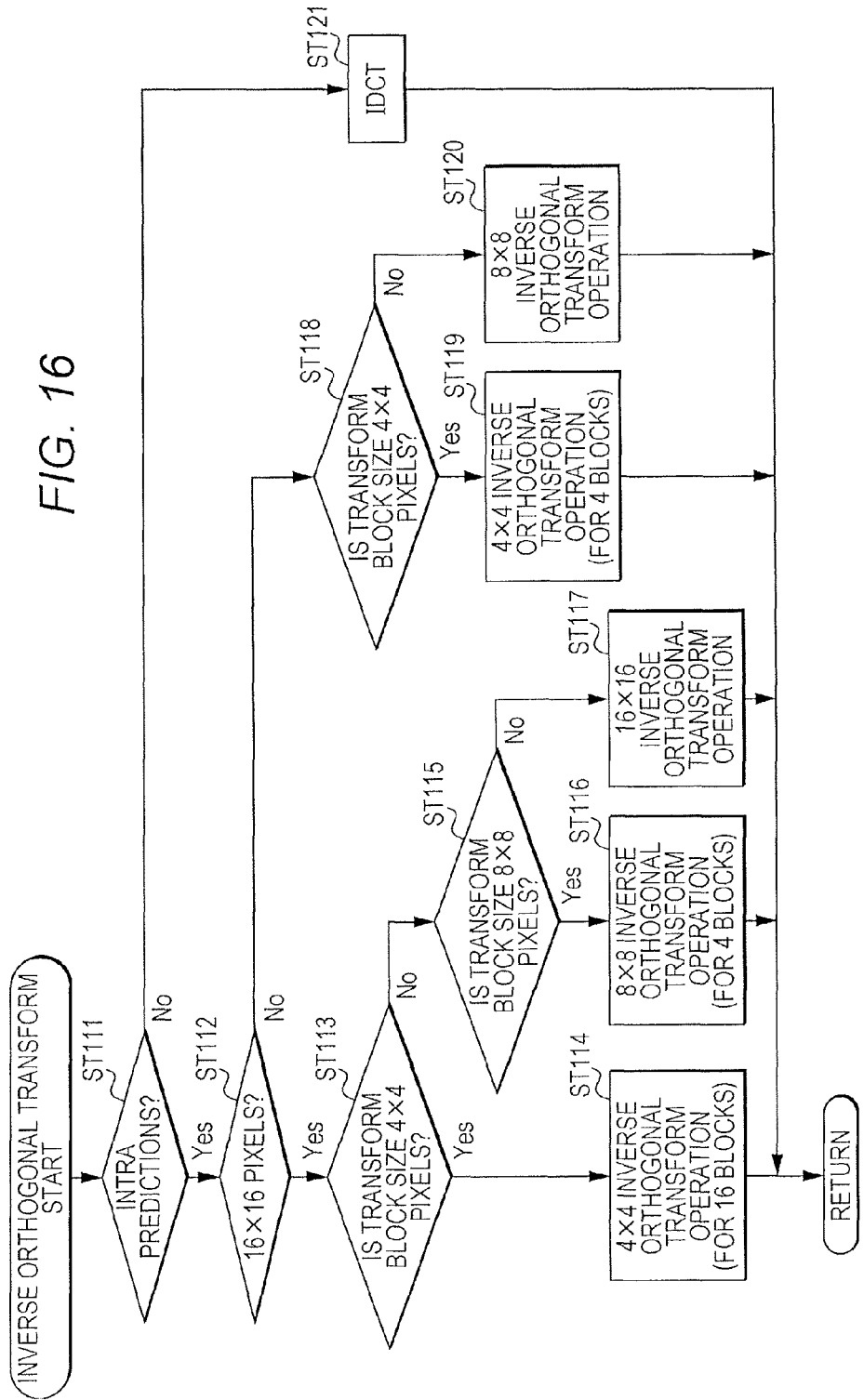
FIG. 16 is a flowchart showing an inverse orthogonal transform operation.

Referring now to the flowchart shown in FIG. 16, the inverse orthogonal transform operation is described. In step ST111, the inverse orthogonal transform unit 54 determines whether there are intra predictions. The inverse orthogonal transform unit 54 determines whether the blocks to be decoded are intra predictions, based on the encoding parameter information extracted from the encoded bit stream by the lossless decoding unit 52, for example. If the encoding parameter information indicates intra predictions, the inverse orthogonal transform unit 54 moves on to step ST112, and if not intra predictions or if inter predictions, moves on to step ST121.

In step ST112, the inverse orthogonal transform unit 54 determines whether the macroblock size is 16×16 pixels. If the macroblock size indicated by the encoding parameter information is 16×16 pixels, the inverse orthogonal transform unit 54 moves on to step ST113, and if not 16×16 pixels, moves on to step ST118.

In step ST113, the inverse orthogonal transform unit 54 determines whether the transform block size is 4×4 pixels. If the transform block size information in the encoding parameter information is "0" and the transform block size is 4×4 pixels, the inverse orthogonal transform unit 54 moves on to step ST114, and if not "0", moves on to step ST115.

In step ST114, the inverse orthogonal transform unit 54 performs a 4×4 inverse orthogonal transform operation. Using the bases learned beforehand in accordance with the prediction mode and the block locations, the inverse orthogonal transform unit 54 performs 4×4 KL inverse transforms. Where the macroblock size is 16×16 pixels, in the encoding, a KL transform is performed sixteen times, and KL transforms are further performed after the lowest-frequency component coefficients are selected from the coefficients obtained by performing the KL transforms. Therefore, the inverse orthogonal transform unit 54 performs KL inverse transforms on the inversely quantized data of the lowest-frequency component coefficients, using the base compatible with the prediction mode. The inverse orthogonal transform unit 54 also performs KL inverse transforms on sixteen blocks formed with the lowest-frequency component coefficients obtained through the KL inverse transforms and the coefficients of the other components, using the bases compatible with prediction mode and the block locations. The inverse orthogonal transform unit 54 outputs the prediction error data obtained by performing the KL inverse transforms to the addition unit 55. That is, the data select unit 548 of the inverse orthogonal transform unit 54 shown in FIG. 14 selects the data obtained by the 4×4 KL inverse transform unit 546 performing KL inverse transforms using the output from the 4×4 KL inverse transform unit 544, and outputs the selected data to the addition unit 55.

In step ST115, the inverse orthogonal transform unit 54 determines whether the transform block size is 8×8 pixels. If the transform block size information in the encoding parameter information is "1" and the transform block size is 8×8 pixels, the inverse orthogonal transform unit 54 moves on to step ST116, and if not "1", moves on to step ST117.

In step ST116, the inverse orthogonal transform unit 54 performs an 8×8 inverse orthogonal transform operation. Using the bases learned beforehand in accordance with the prediction mode and the block locations, the inverse orthogonal transform unit 54 performs 8×8 KL inverse transforms. Where the macroblock size is 16×16 pixels, in the encoding, a KL transform is performed four times, and KL transforms are further performed after the lowest-frequency component coefficients are selected from the coefficients obtained by performing the KL transforms. Therefore, the inverse orthogonal transform unit 54 performs KL inverse transforms on the inversely quantized data of the lowest-frequency component coefficients, using the base compatible with the prediction mode. The inverse orthogonal transform unit 54 also performs KL inverse transforms on four blocks formed with the lowest-frequency component coefficients obtained through the KL inverse transforms and the coefficients of the other components, using the bases compatible with prediction mode and the block locations. The inverse orthogonal transform unit 54 outputs the prediction error data obtained by performing the KL inverse transforms to the addition unit 55. That is, the data select unit 548 of the inverse orthogonal transform unit 54 shown in FIG. 14 selects the data obtained by the 8×8 KL inverse transform unit 543 performing KL inverse transforms using the output from the 2×2 KL inverse transform unit 542, and outputs the selected data to the addition unit 55.

In step ST117, the inverse orthogonal transform unit 54 performs a 16×16 inverse orthogonal transform operation. Using the base learned beforehand in accordance with the prediction mode, the inverse orthogonal transform unit 54 performs 16×16 KL inverse transforms. The inverse orthogonal transform unit 54 outputs the prediction error data obtained by performing the KL inverse transforms to the addition unit 55. That is, the data select unit 548 of the inverse orthogonal transform unit 54 shown in FIG. 14 selects the data obtained by the 16×16 KL inverse transform unit 541 performing KL inverse transforms, and outputs the selected data to the addition unit 55.

When moving from step ST112 on to step ST118, the inverse orthogonal transform unit 54 determines whether the transform block size is 4×4 pixels. If the transform block size information in the encoding parameter information is "0" and the transform block size is 4×4 pixels, the inverse orthogonal transform unit 54 moves on to step ST119, and if not "0", moves on to step ST120.

In step ST119, the inverse orthogonal transform unit 54 performs a 4×4 inverse orthogonal transform operation. Using the bases learned beforehand in accordance with the prediction mode and the block locations, the inverse orthogonal transform unit 54 performs the 4×4 KL inverse transform operation. Where the macroblock size is 8×8 pixels, in the encoding, a KL transform is performed four times, and KL transforms are further performed after the lowest-frequency component coefficients are selected from the coefficients obtained by performing the KL transforms. Therefore, the inverse orthogonal transform unit 54 performs KL inverse transforms on the inversely quantized data of the lowest-frequency component coefficients, using the base compatible with the prediction mode. The inverse orthogonal transform unit 54 also performs KL inverse transforms on four blocks formed with the lowest-frequency component coefficients obtained through the KL inverse transforms and the coefficients of the other components, using the bases compatible with prediction mode and the block locations. The inverse orthogonal transform unit 54 outputs the prediction error data obtained by performing the KL inverse transforms to the addition unit 55. That is, the data select unit 548 of the inverse orthogonal transform unit 54 shown in FIG. 14 selects the data obtained by the 4×4 KL inverse transform unit 546 performing KL inverse transforms using the output from the 2×2 KL inverse transform unit 545, and outputs the selected data to the addition unit 55.

In step ST120, the inverse orthogonal transform unit 54 performs an 8×8 inverse orthogonal transform operation. Using the base learned beforehand in accordance with the prediction mode, the inverse orthogonal transform unit 54 performs 8×8 KL inverse transforms. The inverse orthogonal transform unit 54 outputs the prediction error data obtained by performing the KL inverse transforms to the addition unit 55. That is, the data select unit 548 of the inverse orthogonal transform unit 54 shown in FIG. 14 selects the data obtained by the 8×8 KL inverse transform unit 543 performing KL inverse transforms, and outputs the selected data to the addition unit 55.

In step ST121, the inverse orthogonal transform unit 54 performs inverse discrete cosine transforms (IDCT). The inverse orthogonal transform unit 54 outputs the coefficients obtained by performing the inverse discrete cosine transforms to the addition unit 55. That is, the data select unit 548 of the inverse orthogonal transform unit 54 shown in FIG. 14 selects the data output from the IDCT unit 547, and outputs the selected data to the addition unit 55.

Figure 17:
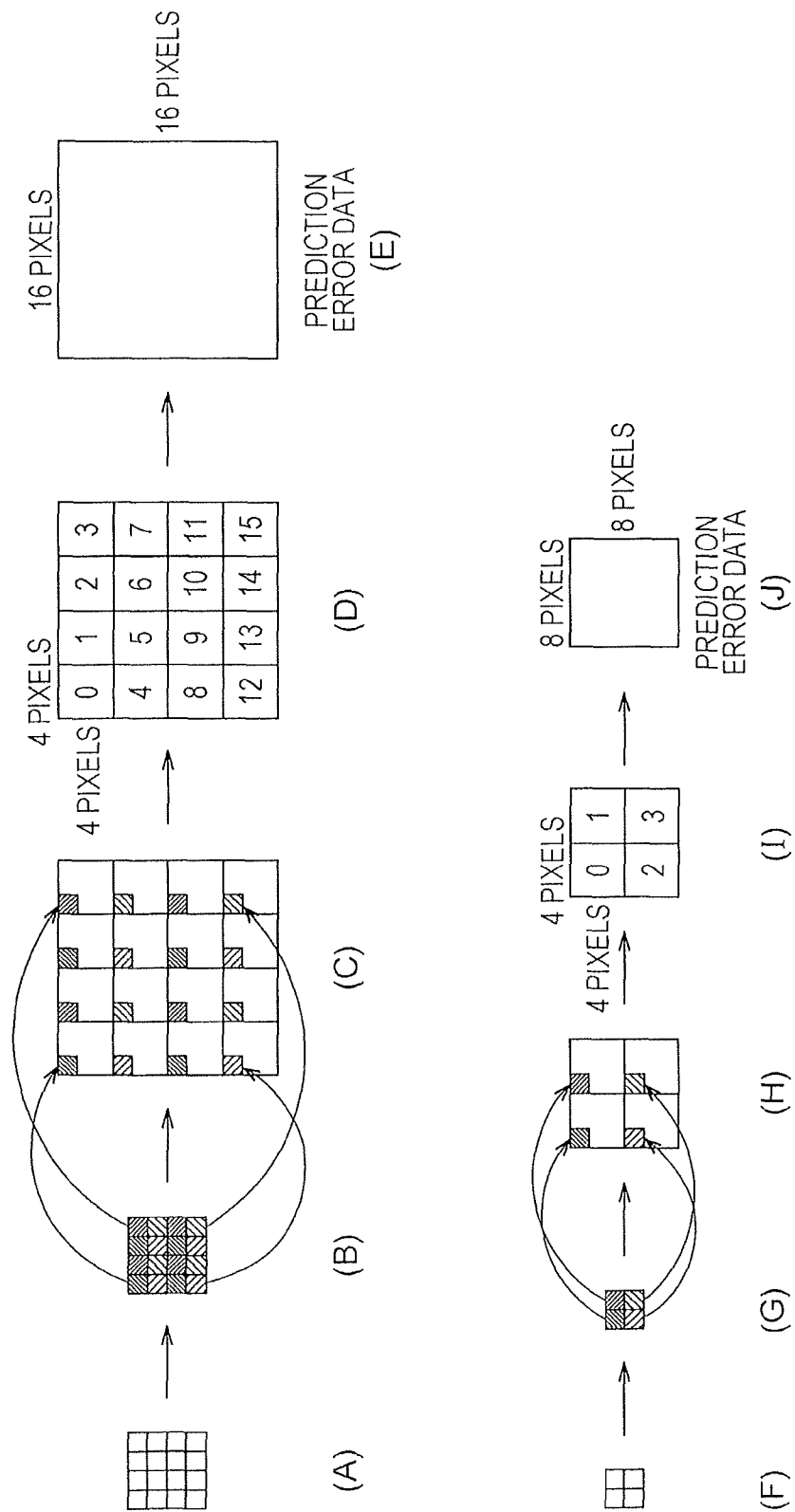
FIG. 17 are diagrams for explaining inverse orthogonal transform operations.

FIG. 17 are diagrams for explaining the inverse orthogonal transform operation, and shows example inverse orthogonal transforms of transform coefficients generated by the orthogonal transform operation of FIG. 12.

There is a case where the macroblock size is 16×16 pixels, and the transform block size is 4×4 pixels, for example. In this case, the 4×4 KL inverse transform unit 544 performs KL inverse transforms on KL-transformed data (inversely quantized data) of the lowest-frequency component coefficients shown in FIG. 17(A), using the base compatible with the prediction mode indicated by optimum mode encoding parameter information. Through the KL inverse transforms, the 4×4 KL inverse transform unit 544 generates the coefficients of the lowest frequency components shown in FIG. 17(B). The 4× 4 KL inverse transform unit 546 returns the lowest-frequency component coefficients and the other KL-transformed data (inversely quantized data) to the coefficients of the respective blocks, as shown in FIG. 17(C).

Further, the 4×4 KL inverse transform unit 546 performs a KL inverse transform on each of the sixteen 4×4 blocks, using the bases compatible with the prediction mode indicated by the encoding parameter information and the block locations, as shown in FIG. 17(D). As a result, the prediction error data shown in FIG. 17(E) is generated. The data select unit 548 selects the generated prediction error data, and outputs the selected data to the addition unit 55.

There is also a case where the macroblock size is 8×8 pixels, and the transform block size is 4×4 pixels, for example. In this case, the 2×2 KL inverse transform unit 545 performs KL inverse transforms on KL-transformed data (inversely quantized data) of the lowest-frequency component coefficients shown in FIG. 17(F), using the base compatible with the prediction mode indicated by the optimum mode encoding parameter information. Through the KL inverse transforms, the 2× 2 KL inverse transform unit 545 generates the lowest-frequency component coefficients shown in FIG. 17(G). The 4×4 KL inverse transform unit 546 returns the lowest-frequency component coefficients and the other KL-transformed data (inversely quantized data) to the coefficients of the respective blocks, as shown in FIG. 17(H). Further, the 4×4 KL inverse transform unit 546 performs a KL inverse transform on each of the four 4×4 blocks, using the bases compatible with the prediction mode indicated by the encoding parameter information and the block locations, as shown in FIG. 17(I). As a result, the prediction error data shown in FIG. 17(J) is generated. The data select unit 548 selects the generated prediction error data, and outputs the selected data to the addition unit 55.

Figure 18:
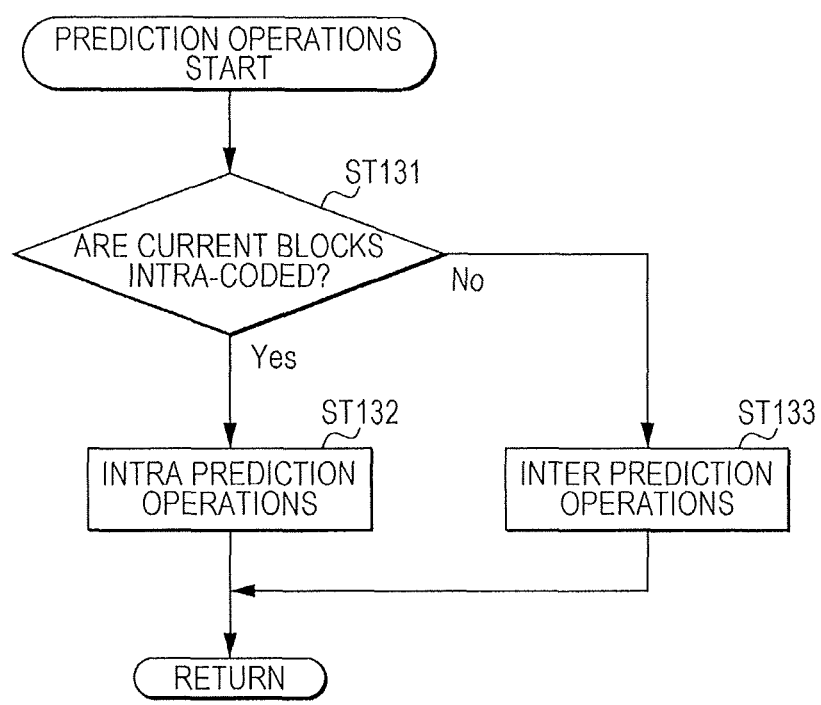
FIG. 18 is a flowchart showing prediction operations.

Referring now to the flowchart in FIG. 18, the prediction operations of step ST98 of FIG. 15 are described.

In step ST131, the lossless decoding unit 52 determines whether the current blocks are intra-coded. If the encoding parameter information obtained by performing lossless decoding is intra prediction information, the lossless decoding unit 52 supplies the encoding parameter information to the intra prediction unit 62, and moves on to step ST132. If the encoding parameter information is not intra prediction information, the lossless decoding unit 52 supplies the encoding parameter information to the motion compensation unit 63, and moves on to step ST133.

In step ST132, the intra prediction unit 62 performs intra prediction operations. Using decoded image data supplied from the addition unit 55 and the encoding parameter information, the intra prediction unit 62 performs intra predictions, to generate predicted image data.

In step ST133, the motion compensation unit 63 performs inter prediction operations. Based on the encoding parameter information and motion vectors supplied from the lossless decoding unit 52, the motion compensation unit 63 performs motion compensation on decoded image data supplied from the frame memory 61. Further, the motion compensation unit 63 outputs the predicted image data generated through the motion compensation to the selector 64.

As described above, by the image decoding apparatus and method of the present invention, decoding is performed on an encoded bit stream generated by processing coefficient data obtained through orthogonal transforms using bases that are set beforehand in accordance with block locations. In this decoding, inverse orthogonal transforms are performed by using bases that are set beforehand in accordance with the block locations in the macroblock indicated by the encoding parameter information contained in the encoded bit stream. Coefficient data subjected to orthogonal transforms can be returned to the prediction error data not yet subjected to the orthogonal transforms. Accordingly, even after orthogonal transforms using the bases compatible with the block locations in the macroblock are performed, the resultant data can be returned to the prediction error data not yet subjected to the orthogonal transforms. Also, even after encoding is performed by using the base in accordance with the prediction mode, the coefficient data subjected to orthogonal transforms can be returned to the prediction error data not yet subjected to the orthogonal transforms by using the base that is set beforehand in accordance with the prediction mode indicated by the encoding parameter information.

<7. Base Learning Operation>

Figure 19:
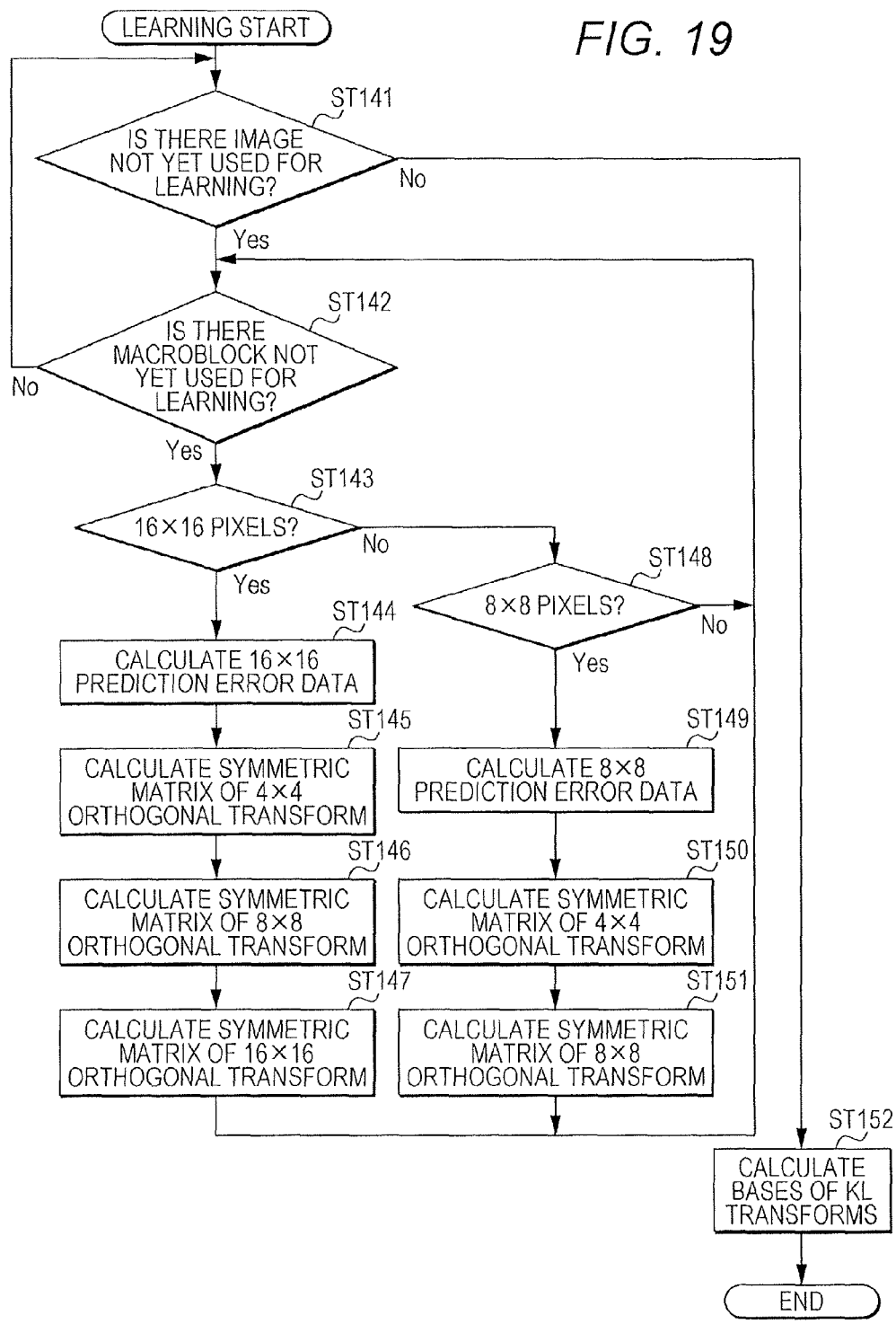
FIG. 19 is a flowchart showing a base learning operation.

Next, a base generation unit that generates the bases to be used in the orthogonal transform unit 14 and the inverse orthogonal transform unit 54 through a learning operation is described. FIG. 19 is a flowchart showing the base learning operation, and the base generation unit generates the bases by performing the operation shown in FIG. 19 using images prepared for the learning. As the images for the learning, as many different images as possible are used so that biases do not occur in the learning depending on the contents of the images.

In step ST141, the base generation unit determines whether there is an image not yet used for the learning. If there is an image not yet used for the learning, the base generation unit moves on to step ST142. If all the images have been used for the learning, the base generation unit moves on to step ST152.

In step ST142, the base generation unit determines whether there is a macroblock not yet used for the learning. If there is a macroblock not yet used for the learning among the images prepared for the learning, the base generation unit moves on to step ST143. If all the macroblocks have been used for the learning, the base generation unit returns to step ST141.

In step ST143, the base generation unit determines whether the macroblock size is 16×16 pixels. If the macroblock size is 16×16 pixels, the base generation unit moves on to step ST144, and if not 16×16 pixels, moves on to step ST148.

In step ST144, the base generation unit generates 16×16 prediction error data. The base generation unit performs intra predictions, to generate the prediction error data of 16×16 pixels.

In step ST145, the base generation unit calculates a symmetric matrix of a 4×4 orthogonal transform. The base generation unit divides the 16×16 prediction error data into sixteen transform blocks of 4×4 pixels, and calculates a symmetric matrix M for each prediction mode and each of the block locations of the transform blocks in the macroblock. The base generation unit arranges the prediction error data of the transform blocks of 4×4 pixels into 16-order vectors, and calculates the difference between the average of the 16-order vectors and each vector. With the difference being "q", the base generation unit performs the calculation expressed by the equation (3), to determine the symmetric matrix M.

[Mathematical Formula 1]

$$M_{(mdt,mdi,loc)} = \sum_{\alpha=num} q_\alpha q_\alpha^T \quad (3)$$

In the equation (3), "mdt" represents transform mode information from which the macroblock size and the transform block size can be determined. In the above equation, "mid" represents the prediction mode of the intra predictions. In the above equation, "loc" represents the block location of the transform block in the macroblock. In the above equation, "num" represents the number of learning times. Also, in the above equation, "T" indicates that the matrix is a transposed matrix.

In step ST146, the base generation unit calculates a symmetric matrix of an 8×8 orthogonal transform. The base generation unit divides the 16×16 prediction error data into four transform blocks of 8×8 pixels, and calculates a symmetric matrix M for each prediction mode and each of the block locations of the transform blocks in the macroblock. The base generation unit arranges the prediction error data of the transform blocks of 8×8 pixels into 64-order vectors, and calculates the difference between the average of the 64-order vectors and each vector. With the difference being "q", the base generation unit performs the calculation expressed by the equation (3), to determine the symmetric matrix M.

In step ST147, the base generation unit calculates a symmetric matrix of a 16×16 orthogonal transform. The base generation unit arranges the prediction error data of a transform block of 16×16 pixels into 256-order vectors for each prediction mode, and calculates the difference between the average of the 256-order vectors and each vector. With the difference being "q", the base generation unit performs the calculation expressed by the equation (3), to determine the symmetric matrix M for each prediction mode.

Moving from step ST143 on to step ST148, the base generation unit determines whether the macroblock size is 8×8 pixels. If the macroblock size is 8×8 pixels, the base generation unit moves on to step ST149, and if not 8×8 pixels, returns to step ST142.

In step ST149, the base generation unit generates 8× 8 prediction error data. The base generation unit performs intra predictions, to generate the prediction error data of 8×8 pixels.

In step ST150, the base generation unit calculates a symmetric matrix of a 4×4 orthogonal transform. The base generation unit divides the 8×8 prediction error data into four transform blocks of 4×4 pixels, and calculates a symmetric matrix M for each prediction mode and each of the block locations of the transform blocks in the macroblock. The base generation unit arranges the prediction error data of the transform blocks of 4×4 pixels into 16-order vectors, and calculates the difference between the average of the 16-order vectors and each vector. With the difference being "q", the base generation unit performs the calculation expressed by the equation (3), to determine the symmetric matrix M.

In step ST151, the base generation unit calculates a symmetric matrix of an 8×8 orthogonal transform. The base generation unit arranges the prediction error data of the transform blocks of 8×8 pixels into 64-order vectors for each prediction mode, and calculates the difference between the average of the 64-order vectors and each vector. With the difference being "q", the base generation unit performs the calculation expressed by the equation (3), to determine the symmetric matrix M for each prediction mode.

In step ST152, the base generation unit calculates bases of KL transforms. The base generation unit determines the eigenvectors corresponding to the eigenvalues of the respective symmetric matrixes M, and arranges the eigenvectors in order of eigenvalue size, to generate the bases of KL transforms.

By performing the above operation, the bases to be used in the KL transforms by the 16×16 KL transform unit 141, the 8×8 KL transform unit 142, the 2×2 KL transform units 143 and 146, and the 4×4 KL transform units 144 and 145 can be generated. Also, by calculating the inverse matrixes of the respective bases, the bases to be used in the KL inverse transforms by the 16×16 KL inverse transform unit 541, the 2×2 KL inverse transform units 542 and 545, the 8×8 KL inverse transform unit 543, and the 4×4 KL inverse transform units 544 and 546 can be generated.

Further, if the bases to be used for performing KL transforms and KL inverse transforms on the respective blocks for the respective block locations in each of the macroblock sizes and for each of the prediction modes are stored in the image encoding apparatus and the image decoding apparatus, the number of bases to be stored becomes large. That is, a memory with a large capacity is required. In view of this, the bases are divided into groups, to reduce the bases to be stored.

Next, two example methods of grouping are described. By a first method, Euclidean distances between bases learned through learning are calculated, and the bases between which the distances are short are grouped together. The bases in the group are replaced with one base representing the group. The number of bases can be reduced by performing grouping in this manner.

Figure 20:
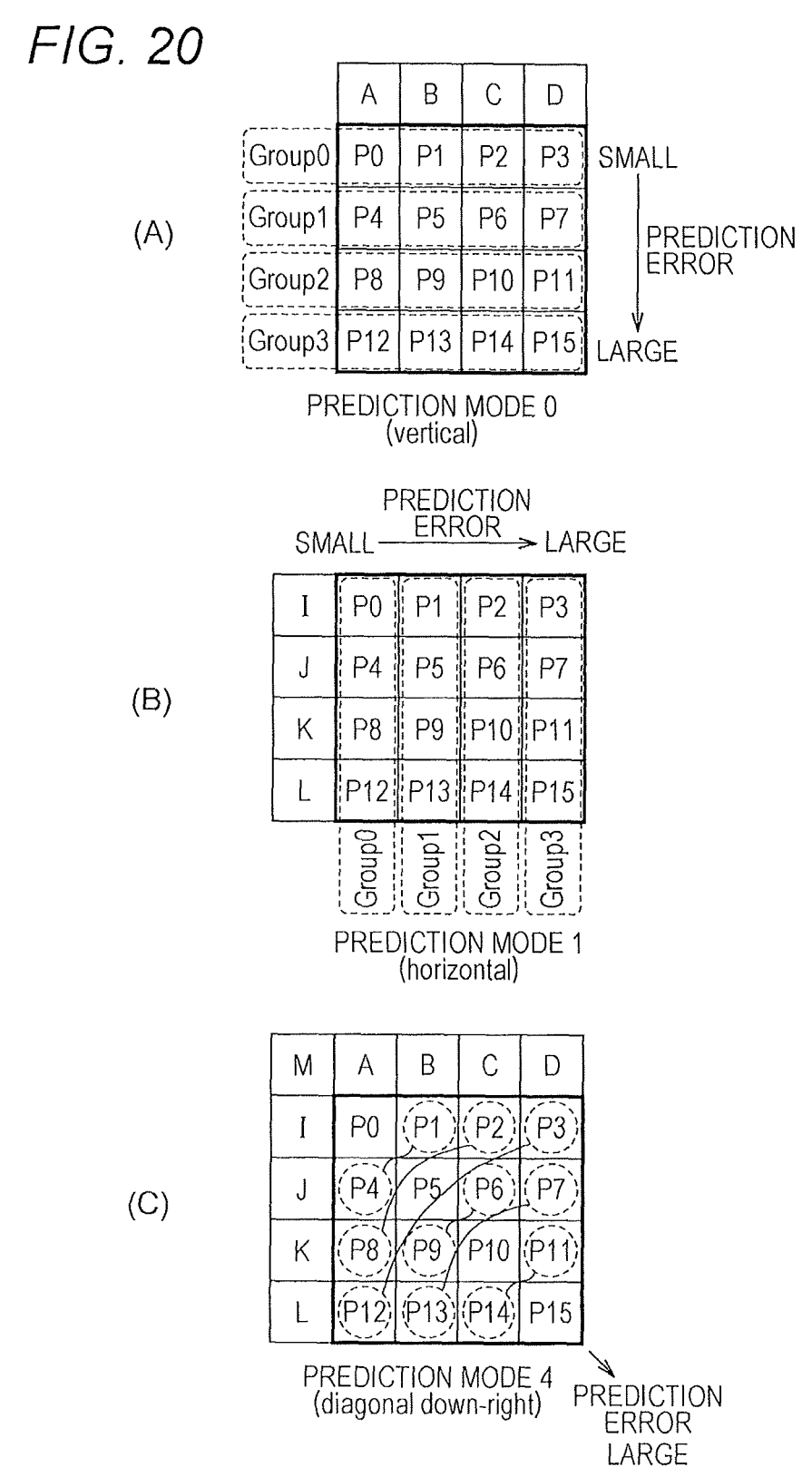

By a second method, grouping is performed in accordance with distances from a reference pixel. As shown in FIG. 20, in the prediction mode 0 (vertical), the blocks of Group 1=(P4, P5, P6, P7) are at the same distance from the reference pixel. In this case, the prediction errors of the pixels P4, P5, P6, and P7 often have similar characteristics. Therefore, one base is used for Group 1. Likewise, one base is used for Group 0, one base is used for Group 2, and one base is used for Group 3. Accordingly, the number of bases can be reduced from 16 to 4.

Likewise, in the prediction mode 1 (horizontal), the blocks of Group 1={P1, P5, P9, P13} are in the same positional relationship with (or at the same distance from) the reference pixel. In this case, the prediction errors of the pixels P1, P5, P9, and P13 often have similar characteristics. Therefore, one base is used for Group 1. Likewise, one base is used for Group 0, one base is used for Group 2, and one base is used for Group 3. Accordingly, the number of bases can be reduced from 16 to 4.

In the prediction mode 4 (diagonal down-right), the relationships between the reference pixel and the respective blocks are not the same. When rotated 90 degrees, however, P12 has the same positional relationship with the reference pixel as P3. In view of this, the pixels are grouped into {P1, P4}, {P2, P8}, {P6, P9}, {P7, P13}, and {P11, P14} in each of which the blocks have the same positional relationship with the reference pixel when rotated 90 degrees, and one base is used for one group.

Further, when rotated 90 degrees in the prediction mode 0 (vertical), the respective blocks have the same positional relationships with the reference pixel as those in the prediction mode 1 (horizontal). Accordingly, the prediction mode 0 (vertical) and the prediction mode 1 (horizontal) are grouped together, so that the number of bases can be further reduced.

<8. Case of Software Processing>

The series of operations described in this specification can be performed by hardware, software, or a combination of hardware and software. In a case where operations are performed by software, a program in which the operation sequences are recorded is installed in a memory incorporated into specialized hardware in a computer. Alternatively, the operations can be performed by installing the program into a general-purpose computer that can perform various kinds of operations.

For example, the program can be recorded beforehand on a hard disk or a ROM (Read Only Memory) as a recording medium. Alternatively, the program can be temporarily or permanently stored (recorded) on a removable recording medium such as a flexible disk, a CD-ROM (Compact Disc Read Only Memory), a MO (MagnetoOptical) disk, a DVD (Digital Versatile Disc), a magnetic disk, or a semiconductor memory. Such a removable recording medium can be provided as so-called package software.

The program can be not only installed into the computer from the above described removable recording medium, but also wirelessly transferred from a download site to the computer or transferred to the computer by wire via a LAN (Local Area Network) or the Internet so that the program transferred in this manner can be received in the computer and be installed into a recording medium such as an internal hard disk.

The step of writing the program includes operations to be performed in parallel or independently of one another if not necessarily in chronological order, as well as operations to be performed in chronological order in accordance with specified order.

<9. Case of Application to an Electronic Device>

In the above described examples, H.264/AVC is used as the encoding/decoding technique. However, the present invention can be applied to image encoding apparatuses and image decoding apparatuses that use other encoding/decoding techniques.

Further, the present invention can be applied to image encoding apparatuses and image decoding apparatuses that are used when image information (encoded bit streams) compressed through orthogonal transforms such as discrete cosine transforms and motion compensation as in MPEG or H.26x is received via a network medium such as satellite broadcasting, cable TV (television), the Internet, or a portable telephone device, or is processed in a storage medium such as an optical or magnetic disk or a flash memory, for example.

The above described image encoding apparatus 10 and the image decoding apparatus 50 can be applied to any electronic apparatuses. The following is a description of such examples.

Figure 21:
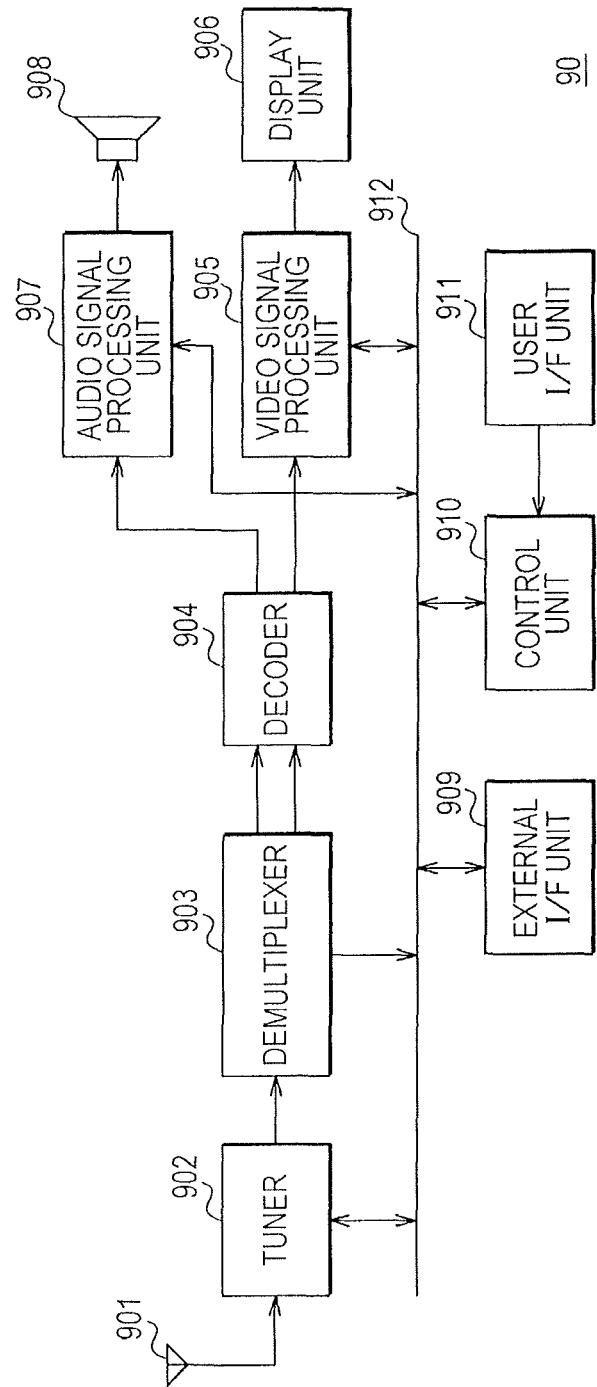
FIG. 21 is a diagram schematically showing an example structure of a television apparatus.

FIG. 21 schematically shows an example structure of a television apparatus to which the present invention is applied. The television apparatus 90 includes an antenna 901, a tuner 902, a demultiplexer 903, a decoder 904, a video signal processing unit 905, a display unit 906, an audio signal processing unit 907, a speaker 908, and an external interface unit 909. The television apparatus 90 further includes a control unit 910, a user interface unit 911, and the like.

The tuner 902 selects a desired channel from broadcast wave signals received at the antenna 901, and performs demodulation. The resultant encoded bit stream is output to the demultiplexer 903.

The demultiplexer 903 extracts the video and audio packets of the show to be viewed from the encoded bit stream, and outputs the data of the extracted packet to the decoder 904. The demultiplexer 903 also supplies a packet of data such as EPG (Electronic Program Guide) to the control unit 910. Where scrambling is performed, the demultiplexer or the like cancels the scrambling.

The decoder 904 performs a packet decoding operation, and outputs the video data generated through the decoding operation to the video signal processing unit 905, and the audio data to the audio signal processing unit 907.

The video signal processing unit 905 subjects the video data to a noise removal and video processing or the like in accordance with user settings. The video signal processing unit 905 generates video data of the show to be displayed on the display unit 906, or generates image data or the like through an operation based on an application supplied via a network. The video signal processing unit 905 also generates video data for displaying a menu screen or the like for item selection, and superimposes the video data on the video data of the show. Based on the video data generated in this manner, the video signal processing unit 905 generates a drive signal to drive the display unit 906.

Based on the drive signal from the video signal processing unit 905, the display unit 906 drives a display device (a liquid crystal display element, for example) to display the video of the show.

The audio signal processing unit 907 subjects the audio data to predetermined processing such as a noise removal, and performs a D/A conversion operation and an amplification operation on the processed audio data. The resultant audio data is supplied as an audio output to the speaker 908.

The external interface unit 909 is an interface for a connection with an external device or a network, and transmits and receives data such as video data and audio data.

The user interface unit 911 is connected to the control unit 910. The user interface unit 911 is formed with operation switches, a remote control signal reception unit, and the like, and supplies an operating signal according to a user operation to the control unit 910.

The control unit 910 is formed with a CPU (Central Processing Unit), a memory, and the like. The memory stores the program to be executed by the CPU, various kinds of data necessary for the CPU to perform operations, the EPG data, data obtained via a network, and the like. The program stored in the memory is read and executed by the CPU at a predetermined time such as the time of activation of the television apparatus 90. The CPU executes the program to control the respective components so that the television apparatus 90 operates in accordance with a user operation.

In the television apparatus 90, a bus 912 is provided for connecting the tuner 902, the demultiplexer 903, the video signal processing unit 905, the audio signal processing unit 907, the external interface unit 909, and the like to the control unit 910.

In the television apparatus having such a structure, the decoder 904 has the functions of the image decoding apparatus (the image decoding method) of the present invention. As the functions of the image encoding apparatus of the present invention are used on the broadcasting station side, encoded bit streams can be correctly decoded in the television apparatus, even if the encoded bit streams have been generated at a higher encoding efficiency and with higher image quality.

Figure 22:
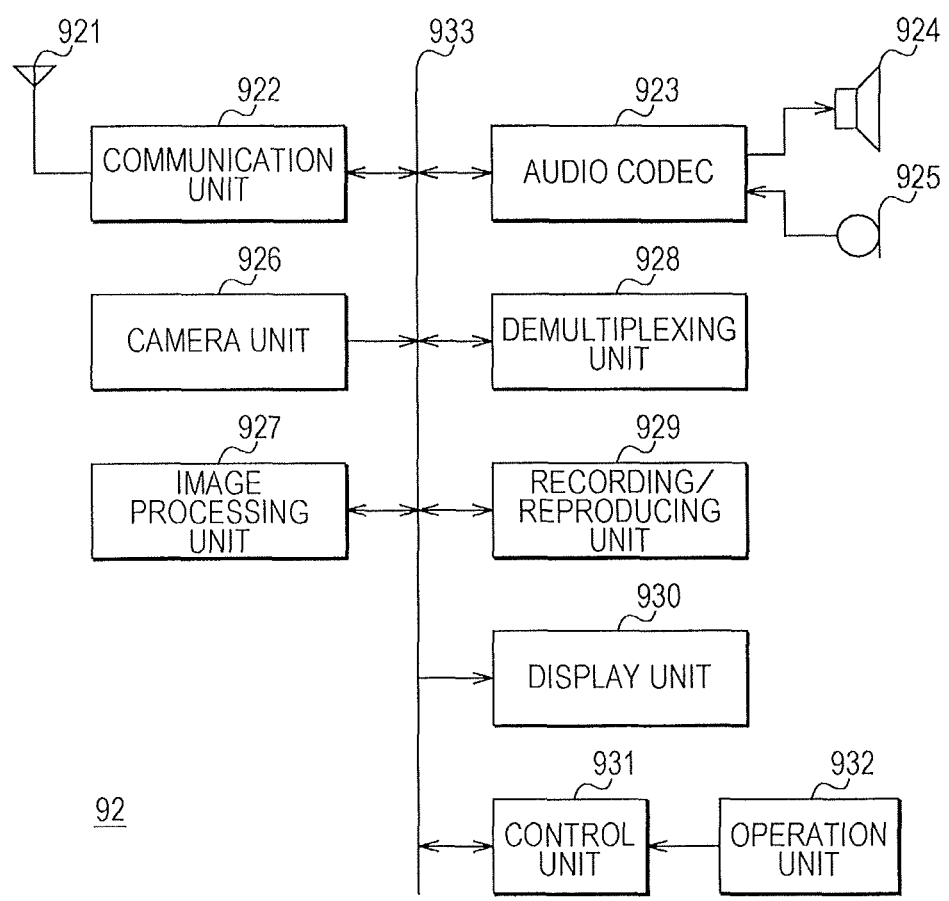
FIG. 22 is a diagram schematically showing an example structure of a portable telephone device.

FIG. 22 schematically shows an example structure of a portable telephone device to which the present invention is applied. The portable telephone device 92 includes a communication unit 922, an audio codec 923, a camera unit 926, an image processing unit 927, a demultiplexing unit 928, a recording/reproducing unit 929, a display unit 930, and a control unit 931. Those components are connected to one another via a bus 933.

Also, an antenna 921 is connected to the communication unit 922, and a speaker 924 and a microphone 925 are connected to the audio codec 923. Further, an operation unit 932 is connected to the control unit 931.

The portable telephone device 92 performs various kinds of operations such as transmission and reception of audio signals, transmission and reception of electronic mail and image data, image capturing, and data recording, in various kinds of modes such as an audio communication mode and a data communication mode.

In the audio communication mode, an audio signal generated at the microphone 925 is converted into audio data, and the data is compressed at the audio codec 923. The compressed data is supplied to the communication unit 922. The communication unit 922 performs a modulation operation, a frequency conversion operation, and the like on the audio data, to generate a transmission signal. The communication unit 922 also supplies the transmission signal to the antenna 921, and the transmission signal is transmitted to a base station (not shown). The communication unit 922 also amplifies a signal received at the antenna 921, and performs a frequency conversion operation, a demodulation operation, and the like. The resultant audio data is supplied to the audio codec 923. The audio codec 923 decompresses audio data, and converts the audio data into an analog audio signal that is output to the speaker 924.

In a case where mail transmission is performed in the data communication mode, the control unit 931 receives text data that is input through an operation by the operation unit 932, and the input text is displayed on the display unit 930. In accordance with a user instruction or the like through the operation unit 932, the control unit 931 generates and supplies mail data to the communication unit 922. The communication unit 922 performs a modulation operation, a frequency conversion operation, and the like on the mail data, and transmits the resultant transmission signal from the antenna 921. The communication unit 922 also amplifies a signal received at the antenna 921, and performs a frequency conversion operation, a demodulation operation, and the like, to restore the mail data. This mail data is supplied to the display unit 930, and the mail content is displayed.

The portable telephone device 92 can cause the recording/reproducing unit 929 to store received mail data into a storage medium. The storage medium is a rewritable storage medium. For example, the storage medium may be a semiconductor memory such as a RAM or an internal flash memory, a hard disk, or a removable medium such as a magnetic disk, a magnetooptical disk, an optical disk, a USE memory, or a memory card.

In a case where image data is transmitted in the data communication mode, image data generated at the camera unit 926 is supplied to the image processing unit 927. The image processing unit 927 performs an encoding operation on the image data, to generate encoded data.

The demultiplexing unit 928 multiplexes the encoded data generated at the image processing unit 927 and the audio data supplied from the audio codec 923 by a predetermined technique, and supplies the multiplexed data to the communication unit 922. The communication unit 922 performs a modulation operation, a frequency conversion operation, and the like on the multiplexed data, and transmits the resultant transmission signal from the antenna 921. The communication unit 922 also amplifies a signal received at the antenna 921, and performs a frequency conversion operation, a demodulation operation, and the like, to restore the multiplexed data. This multiplexed data is supplied to the demultiplexing unit 928. The demultiplexing unit 928 divides the multiplexed data, and supplies the encoded data to the image processing unit 927, and the audio data to the audio codec 923. The image processing unit 927 performs a decoding operation on the encoded data, to generate image data. This image data is supplied to the display unit 930, to display the received images. The audio codec 923 converts the audio data into an analog audio signal that is output to the speaker 924, and the received sound is output.

In the portable telephone device having the above structure, the image processing unit 927 has the functions of the image encoding apparatus (the image encoding method) and the image decoding apparatus (the image decoding method) of the present invention. Accordingly, when image data is communicated, encoding efficiency and image quality can be improved.

Figure 23:
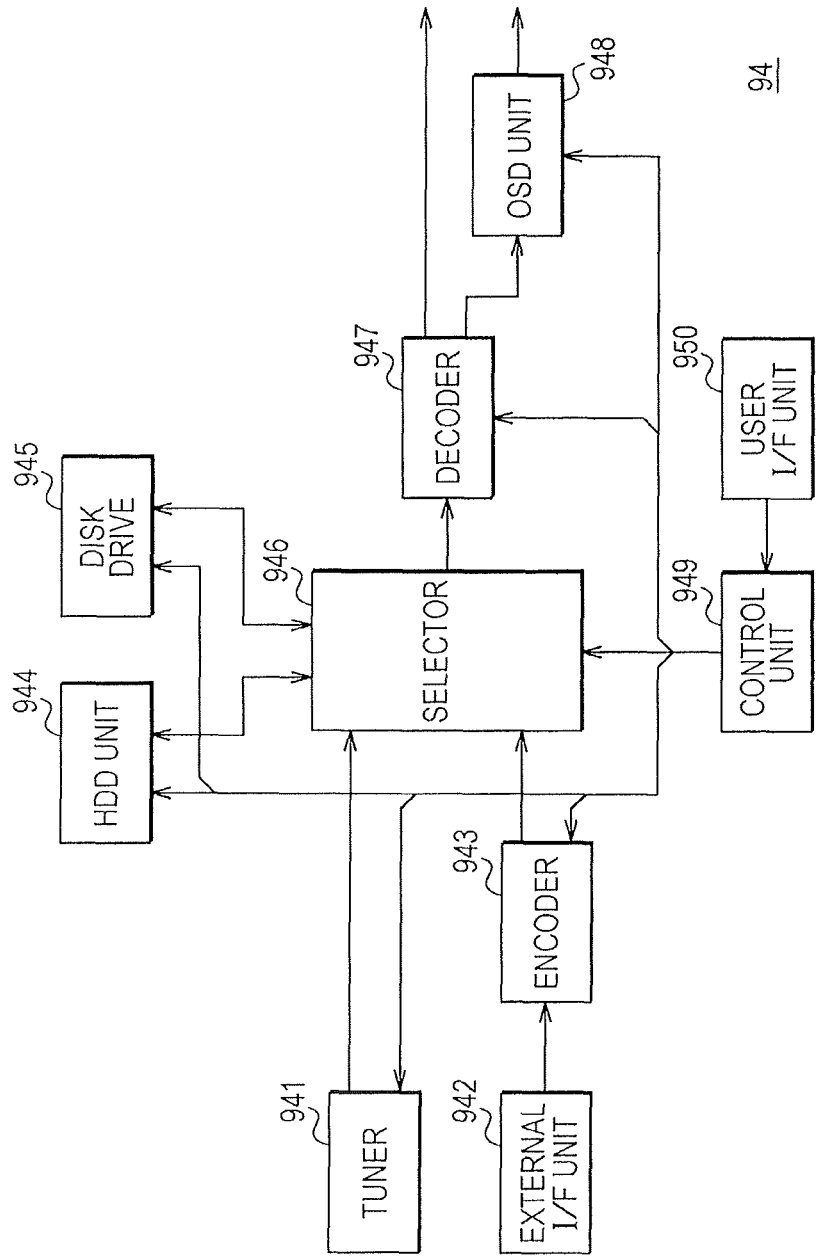
FIG. 23 is a diagram schematically showing an example structure of a recording/reproducing apparatus.

FIG. 23 schematically shows an example structure of a recording/reproducing apparatus to which the present invention is applied. The recording/reproducing apparatus 94 records the audio data and video data of a received broadcast show on a recording medium, and provides the recorded data to a user at a time according to an instruction from the user. The recording/reproducing apparatus 94 can also obtain audio data and video data from another apparatus, for example, and record the data on a recording medium. Further, the recording/reproducing apparatus 94 decodes and outputs audio data and video data recorded on a recording medium, so that a monitor device or the like can display images and outputs sound.

The recording/reproducing apparatus 94 includes a tuner 941, an external interface unit 942, an encoder 943, a HDD (Hard Disk Drive) unit 944, a disk drive 945, a selector 946, a decoder 947, an OSD (On-Screen Display) unit 948, a control unit 949, and a user interface unit 950.

The tuner 941 selects a desired channel from broadcast signals received at an antenna (not shown). The tuner 941 demodulates the received signal of the desired channel, and outputs the resultant encoded bit stream to the selector 946.

The external interface unit 942 is formed with at least one of an IEEE1394 interface, a network interface unit, a USB interface, a flash memory interface, and the like. The external interface unit 942 is an interface for a connection with an external device, a network, a memory card, or the like, and receives data such as video data and audio data to be recorded and the like.

The encoder 943 performs predetermined encoding on video data and audio data that are supplied from the external interface unit 942 and are not encoded, and outputs the encoded bit stream to the selector 946.

The HDD unit 944 records content data such as videos and sound, various kinds of programs, other data, and the like on an internal hard disk, and reads the data from the hard disk at the time of reproduction or the like.

The disk drive 945 performs signal recording and reproduction on a mounted optical disk. The optical disk may be a DVD disk (such as a DVD-Video, a DVD-RAM, a DVD-R, a DVD-RW, or a DVD+R, or a DVD+RW) or a Blu-ray disk, for example.

The selector 946 selects an encoded bit stream from the tuner 941 or the encoder 943 at the time of video and audio recording, and supplies the encoded bit stream to either the HDD unit 944 or the disk drive 945. The selector 946 also supplies an encoded bit stream output from the HDD unit 944 or the disk drive 945 to the decoder 947 at the time of video and audio reproduction.

The decoder 947 performs a decoding operation on an encoded bit stream. The decoder 947 supplies the video data generated by performing the decoding to the OSD unit 948. The decoder 947 also outputs the audio data generated by performing the decoding.

The OSD unit 948 also generates video data for displaying a menu screen or the like for item selection, and superimposes the video data on video data output from the decoder 947.

The user interface unit 950 is connected to the control unit 949. The user interface unit 950 is formed with operation switches, a remote control signal reception unit, and the like, and supplies an operating signal according to a user operation to the control unit 949.

The control unit 949 is formed with a CPU, a memory, and the like. The memory stores the program to be executed by the CPU and various kinds of data necessary for the CPU to perform operations. The program stored in the memory is read and executed by the CPU at a predetermined time such as the time of activation of the recording/reproducing apparatus 94. The CPU executes the program to control the respective components so that the recording/reproducing apparatus 94 operates in accordance with a user operation.

In the recording/reproducing apparatus having the above structure, the encoder 943 has the functions of the image encoding apparatus (the image encoding method) of the present invention, and the decoder 947 has the functions of the image decoding apparatus (the image decoding method), so that encoding efficiency and image quality can be improved, and video recording and reproduction can be efficiently performed.

Figure 24:
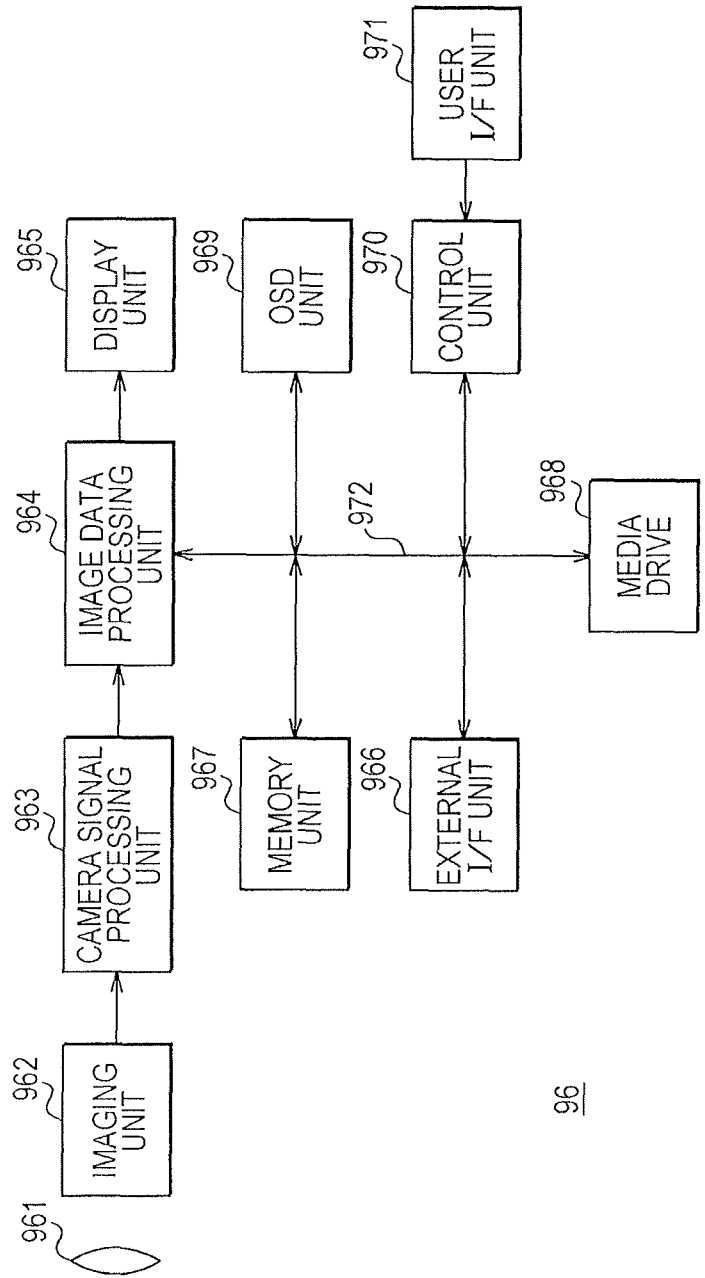
FIG. 24 is a diagram schematically showing an example structure of an imaging apparatus.

FIG. 24 schematically shows an example structure of an imaging apparatus to which the present invention is applied. An imaging apparatus 96 captures an image of an object, and causes a display unit to display the image of the object or records the image as image data on a recording medium.

The imaging apparatus 96 includes an optical block 961, an imaging unit 962, a camera signal processing unit 963, an image data processing unit 964, a display unit 965, an external interface unit 966, a memory unit 967, a media drive 968, an OSD unit 969, and a control unit 970. A user interface unit 971 is connected to the control unit 970. Further, the image data processing unit 964, the external interface unit 966, the memory unit 967, the media drive 968, the OSD unit 969, the control unit 970, and the like are connected via a bus 972.

The optical block 961 is formed with a focus lens, a diaphragm, and the like. The optical block 961 forms an optical image of an object on the imaging surface of the imaging unit 962. Formed with a CCD or a CMOS image sensor, the imaging unit 962 generates an electrical signal in accordance with the optical image through a photoelectric conversion, and supplies the electrical signal to the camera signal processing unit 963.

The camera signal processing unit 963 performs various kinds of camera signal processing such as a knee correction, a gamma correction, and a color correction on the electrical signal supplied from the imaging unit 962. The camera signal processing unit 963 supplies the image data subjected to the camera signal processing to the image data processing unit 964.

The image data processing unit 964 performs an encoding operation on the image data supplied from the camera signal processing unit 963. The image data processing unit 964 supplies the encoded data generated by performing the encoding operation to the external interface unit 966 and the media drive 968. The image data processing unit 961 also performs a decoding operation on the encoded data supplied from the external interface unit 966 and the media drive 968. The image data processing unit 964 supplies the image data generated by performing the decoding operation to the display unit 965. The image data processing unit 964 also performs an operation to supply the image data supplied from the camera signal processing unit 963 to the display unit 965, or superimposes display data obtained from the OSD unit 969 on the image data and supplies the image data to the display unit 965.

The OSD unit 969 generates a menu screen formed with symbols, characters, or figures, or display data such as icons, and outputs the data to the image data processing unit 964.

The external interface unit 966 is formed with a USB input/output terminal and the like, for example, and is connected to a printer when image printing is performed. A drive is also connected to the external interface unit 966 where necessary, and a removable medium such as a magnetic disk or an optical disk is mounted on the drive as appropriate. A computer program read from such a removable disk is installed where necessary. Further, the external interface unit 966 includes a network interface connected to a predetermined network such as a LAN or the internet. The control unit 970 reads encoded data from the memory unit 967 in accordance with an instruction from the user interface unit 971, for example, and can supply the encoded data from the external interface unit 966 to another apparatus connected via a network. The control unit 970 can also obtain, via the external interface unit 966, encoded data or image data supplied from another apparatus via a network, and supply the encoded data or image data to the image data processing unit 964.

A recording medium to be driven by the media drive 968 may be a readable/rewritable removable disk such as a magnetic disk, a magnetooptical disk, an optical disk, or a semiconductor memory. The recording medium may be any type of removable medium, and may be a tape device, a disk, or a memory card. The recording medium may of course be a non-contact IC card or the like.

Alternatively, the media drive 968 and a recording medium may be integrated, and may be formed with an immobile storage medium such as an internal hard disk drive or a SSD (Solid State Drive).

The control unit 970 is formed with a CPU, a memory, and the like. The memory stores the program to be executed by the CPU, various kinds of data necessary for the CPU to perform operations, and the like. The program stored in the memory is read and executed by the CPU at a predetermined time such as the time of activation of the imaging apparatus 96. The CPU executes the program to control the respective components so that the imaging apparatus 96 operates in accordance with a user operation.

In the imaging apparatus having the above structure, the image data processing unit 964 has the functions of the image encoding apparatus (the image encoding method) and the image decoding apparatus (the image decoding method) of the present invention. Accordingly, when captured images are recorded into the memory unit 967 or a recording medium or the like, encoding efficiency and image quality can be improved, and the captured images can be efficiently recorded and reproduced.

Further, the present invention should not be interpreted to be limited to the above described embodiments of the invention. For example, the present invention should not be limited to the above described macroblock sizes, transform block sizes, and prediction modes. The embodiments of the invention disclose the present invention through examples, and it should be obvious that those skilled in the art can modify or replace those embodiments with other embodiments without departing from the scope of the invention. That is, the claims should be taken into account in understanding the subject matter of the invention.

INDUSTRIAL APPLICABILITY

With the image decoding apparatus, the image encoding apparatus, and the methods and programs of the present invention, the bases that are set beforehand in accordance with the block locations of the transform blocks in a macroblock are used to perform orthogonal transforms at the time of image data encoding. Also, in decoding an encoded bit stream that is generated by processing coefficient data obtained through an orthogonal transform using the bases set beforehand in accordance with the block locations, the bases that are set beforehand in accordance with the block locations in the macroblock indicated by the encoding parameter information contained in the encoded bit stream are used to perform an inverse orthogonal transform, and the coefficient data subjected to the orthogonal transform is returned to the prediction error data not yet subjected to the orthogonal transform. As an orthogonal transform and an inverse orthogonal transform are performed by using the bases compatible with the block locations in a macroblock as described above, transforms that are optimized in accordance with the block locations can be performed, and encoding efficiency can be increased. Accordingly, the present invention is suitably applied to an image decoding apparatus, an image encoding apparatus, and the like that are used when image information (encoded bit streams) obtained through block-based encoding as in MPEG, H.26x, or the like is transmitted or received via a network medium such as satellite broadcasting, cable TV, the Internet, or a portable telephone device.

REFERENCE SIGNS LIST

10 . . . image encoding apparatus 11 . . . A/D conversion unit 12, 57 . . . picture rearrangement buffer 13 . . . subtraction unit 14 . . . orthogonal transform unit 15 . . . quantization unit 16 . . . lossless coding unit 17, 51 . . . accumulation buffer 18 . . . rate control unit 21, 53 . . . inverse quantization unit 22, 54 . . . inverse orthogonal transform unit 23, 55 . . . addition unit 24, 56 . . . deblocking filter 27, 61 . . . frame memory 31, 62 . . . intra prediction unit 32, 63 . . . motion prediction/compensation unit 33 . . . predicted image/optimum mode select unit 50 . . . image decoding apparatus 52 . . . lossless decoding unit 58 . . . D/A conversion unit 64, 946 . . . selector 90 . . . television apparatus 92 . . . portable telephone device 94 . . . recording/reproducing apparatus 96 . . . imaging apparatus 141 . . . 16×16 KL transform unit 142 . . . 8×8 KL transform unit 143, 146 . . . 2×2 KL transform unit 144, 145 . . . 4×4 KL transform unit 147 . . . DCT unit 148 . . . coefficient select unit 541 . . . 16×16 KL inverse transform unit 542, 545 . . . 2×2 KL inverse transform unit 543 . . . 8×8 KL inverse transform unit 544, 546 . . . KL inverse transform unit 547 . . . IDCT unit 548 . . . data select unit 901, 921 . . . antenna 902, 941 . . . tuner 903 . . . demultiplexer 904, 947 . . . decoder 905 . . . video signal processing unit 906 . . . display unit 907 . . . audio signal processing unit 908 . . . speaker 909, 942, 966 . . . external interface unit 910, 931, 949, 970 . . . control unit 911, 932, 971 . . . user interface unit 912, 933, 972 . . . bus 922 . . . communication unit 923 . . . audio codec 924 . . . speaker 925 . . . microphone 926 . . . camera unit 927 . . . image processing unit 928 . . . demultiplexing unit 929 . . . recording/reproducing unit 930 . . . display unit 943 . . . encoder 944 . . . HDD unit 945 . . . disk drive 948, 969 . . . OSD unit 961 . . . optical block 962 . . . imaging unit 963 . . . camera signal processing unit 964 . . . image data processing unit 965 . . . display unit 967 . . . memory unit 968 . . . media drive

The invention claimed is:

1. An image decoding apparatus comprising:
processing circuitry configured to
   receive encoding parameter information included in an encoding bit stream;
   perform an inverse orthogonal transform based on a location of a transform block indicated by the encoding parameter information;
   generate a prediction image data based on the encoding parameter information; and
   decode an image data included in the encoding bit stream by adding the generated prediction image data to a prediction difference data obtained by performing the inverse orthogonal transform, to decode the image data,
wherein the processing circuitry is further configured to perform the inverse orthogonal transform by using a base set beforehand in accordance with the location of the transform block and a prediction mode indicated by the encoding parameter information, and
wherein, when the encoding parameter information indicates that the block contains a plurality of transform blocks, the processing circuitry is further configured to perform the inverse orthogonal transform by using a base on orthogonally transformed coefficient data of the lowest-frequency component coefficient data after an orthogonal transform of the respective transform blocks contained in the block, the base being set beforehand in accordance with the prediction mode.

2. The image decoding apparatus according to claim 1, wherein the processing circuitry is further configured to perform the determined inverse orthogonal transform by using a base being set beforehand in accordance with a location of the transform block in a block indicated by the encoding parameter information.

3. The image decoding apparatus according to claim 2, wherein the base used by the processing circuitry in the inverse orthogonal transform is an inverse matrix of a base used in the orthogonal transform of the prediction error data of each transform block.

4. The image decoding apparatus according to claim 1, wherein the processing circuitry is further configured to perform a Karhunen-Loeve inverse transform using the base.

5. An image decoding method comprising:
   receiving encoding parameter information included in an encoding bit stream;
   performing an inverse orthogonal transform based on a location of a transform block indicated by the encoding parameter information;
   generating a prediction image data based on the encoding parameter information;
   decoding an image data included in the encoding bit stream by adding the generated prediction image data to a prediction difference data obtained by performing the inverse orthogonal transform, to decode the image data;
   performing the inverse orthogonal transform by using a base set beforehand in accordance with the location of the transform block and a prediction mode indicated by the encoding parameter information; and
   when the encoding parameter information indicates that the block contains a plurality of transform blocks, performing the inverse orthogonal transform by using a base on orthogonally transformed coefficient data of the lowest-frequency component coefficient data after an orthogonal transform of the respective transform blocks contained in the block, the base being set beforehand in accordance with the prediction mode.

6. The image decoding method according to claim 5, further comprising:
   performing the determined inverse orthogonal transform by using a base being set beforehand in accordance with a location of the transform block in a block indicated by the encoding parameter information.

7. The image decoding method according to claim 6, wherein the base used in the inverse orthogonal transform is an inverse matrix of a base used in the orthogonal transform of the prediction error data of each transform block.

8. The image decoding method according to claim 5, further comprising:
   performing a Karhunen-Loeve inverse transform using the base.

* * * * *